United States Patent [19]

Rankin et al.

[11] Patent Number: 5,062,820

[45] Date of Patent: Nov. 5, 1991

[54] AUTOMATIC ANIMAL PROCESSING

[75] Inventors: Russel J. Rankin, Clean Mountain; David J. de Chastel, deceased, late of Virginia, by Ann de Chastel, executrix; Graeme L. Wescombe, Manly West; David T. Kerr, Beenleigh; Phillip R. Boyce, Tingalpa; Raymond M. White, Capalaba; Robert W. Tritchler, Manly; John W. Buhot, Coorparoo, all of Australia

[73] Assignees: Commonwealth Scientific & Industrial Research Organisation; Australian Meat & Live-Stock Research & Development Corp., both of Australia

[21] Appl. No.: 566,386

[22] PCT Filed: Dec. 22, 1988

[86] PCT No.: PCT/AU88/00496

§ 371 Date: Aug. 23, 1990

§ 102(e) Date: Aug. 23, 1990

[87] PCT Pub. No.: WO89/05584

PCT Pub. Date: Jun. 29, 1989

[30] Foreign Application Priority Data

Dec. 23, 1987 [AU] Australia ................... PI6045

[51] Int. Cl.5 ............................................. A22C 11/02
[52] U.S. Cl. ..................................... 452/187; 452/120; 452/160
[58] Field of Search ............... 452/120, 122, 160, 106, 452/149, 150, 152, 153, 187, 128

[56] References Cited

U.S. PATENT DOCUMENTS 4,011,630 3/1977 Ochylski .................... 452/128
4,087,866 5/1978 Aubert ....................... 452/122
4,299,010 11/1981 Robertson et al. ............ 452/128

Primary Examiner—Frederick R. Schmidt
Assistant Examiner—Lawrence Cruz
Attorney, Agent, or Firm—Lowe, Price, LeBlanc and Becker

[57] ABSTRACT

An apparatus for automatically processing an animal carcass (8). Suspension means (122, 123) suspends the carcass (8) in an inverted position with the spine inclined upwardly towards the neck (11) with the spine located beneath the carcass (8) and so that the diaphragm (119) is approximately vertical. A cutting assembly (130) moves into the abdominal cavity adjacent to the diaphragm (119), and a cutting means (28) cuts the diaphragm (119) around the periphery. A brisket shearing means (21) cuts the brisket (20) with a shearing action along the brisket (20) from the abdomen and towards the neck end of the brisket (20). The reaction member (188) is pivotally movable relative to the brisket (20) about a rear end to generally follow the contours of the brisket (20). Head holding means (12) locates and clamps the head (10) against movement, and stretching means (15) stretches the neck of the carcass (8) so as to spread the atlas joint, and a cutting blade (156) moves along the line of the jaw (9) and through the atlas joint so as to sever the head (10). Splitting support means (81) is movable lengthwise along the carcass (82), an opposed pair of rolling or sliding spine tracking means (86) carried by the splitting support means (81) straddles, locates and restrains the spine against lateral movement while cutting means (87, 200) splits the carcass (82) at the tracking means (86).

10 Claims, 14 Drawing Sheets

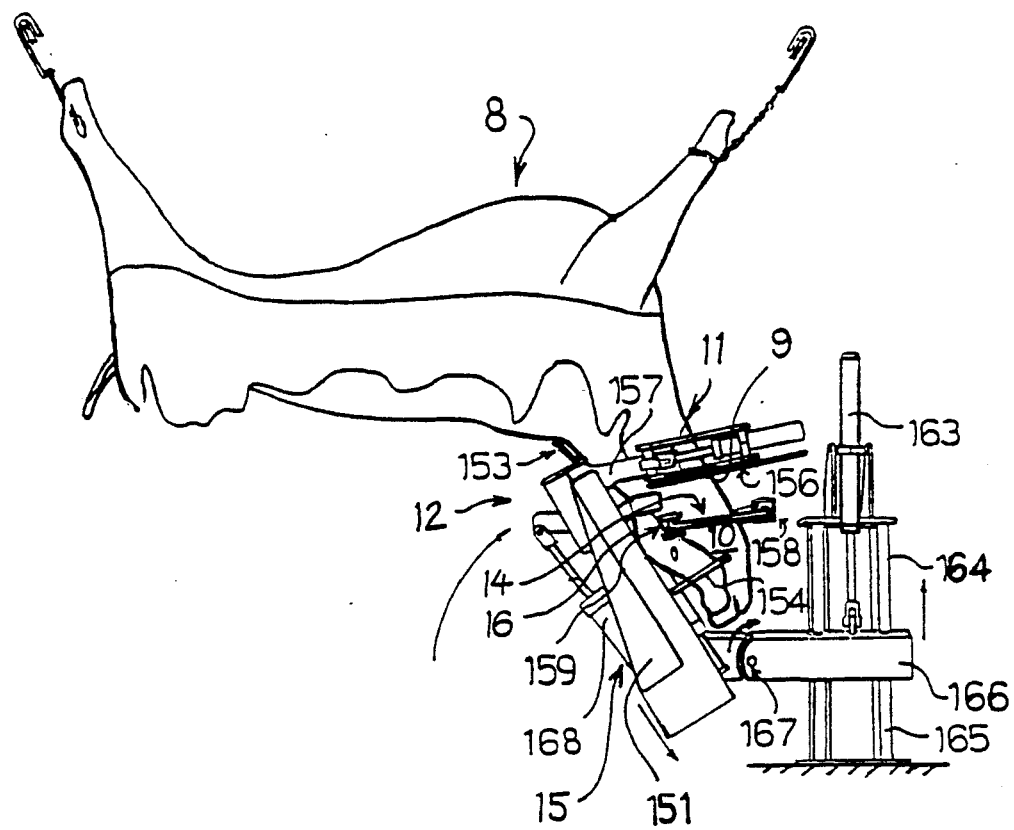
FIG. 2
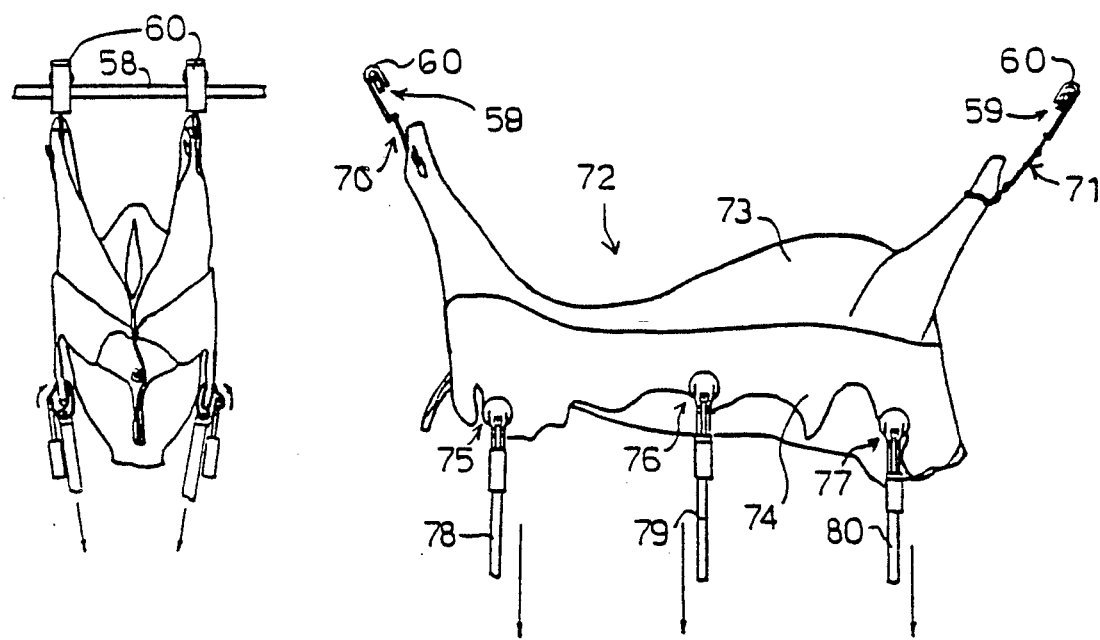
FIG. 4
FIG. 5

AUTOMATIC ANIMAL PROCESSING

This invention relates to the handling of animals and, in particular, to apparatus for automatic processing of animals as in abattoirs, boning plants, etc.

In Australian Patent Specification Nos. 35,992/84 and 19,034/88, an animal processing line is described which includes an animal lead up race, capture and stun assembly, and hock and horn removal stations located after the animal has been stuck. The carcass is then ready for manual or automatic dressing and boning operations.

One of the operations carried out on a carcass during dressing and boning operations is cutting of the brisket to assist in the removal of viscera from the carcass. This is usually carried out under direct manual control which adds to the processing costs per carcass. In Australian Patent Specification No. 31,317/84 there is described an automatic apparatus for cutting the brisket of a carcass suspended by the forelegs. The apparatus includes a circular saw which is lowered and moves downwardly from the neck region through the brisket and abdomen. There is still substantial risk of cutting viscera with this apparatus. Also a circular saw can easily stall due to an increase in resistance. Also circular saws can be difficult to guide. Furthermore a circular saw creates a substantial amount of bone dust requiring removal and also there is a significant loss of saleable body weight due to the width of brisket and tissue cut out by the saw.

Another operation usually carried out manually in processing of an animal carcass is removal of the head. The carrying out of this process manually requires substantial skill and strength and also requires a process operator thereby adding to the processing cost. In Australian Patent Specification No. 57,413/86 there is described an apparatus for automatically breaking or dislocating the neck of a suspended carcass, particularly a sheep carcass. However even if this apparatus were to be adapted for use with removing the head, there would be substantial loss or downgrading of saleable meat from the neck of the carcass as a result of a substantial part of the neck being removed with the head. Also, the head is relatively unrestrained leading to poor repeatability of the precise cut. Also the head would fall away from the apparatus so that further processing of the head may need to rectify potential problems with handling to achieve the required orientation and dealing with contamination of the fallen head.

A further operation carried out on a carcass involves splitting the carcass into two sides after evisceration. Although automatic apparatus for carcass splitting has been proposed in the past, the difficulties of accurately locating and tracking a saw along the spine have been unsatisfactory solved, resulting in for example wandering of the saw away from the centre of the spine, particularly when the saw reaches the neck of the carcass. Movement of the carcass, particularly the neck can result in "soft siding" where the saw blade runs off the spine and cuts through meat to one side with consequent damage to that meat and loss of or reduction in value of the meat. Circular saw blades have been used in earlier proposals to automatically split a carcass. A circular saw blade results in the creation of substantial bone dust and loss of saleable body weight as a result of the width of bone and meat cut by the saw.

Diaphragm cutting has been carried out in the past manually as a part of the evisceration of the carcass. Manual operations used in dressing and boning operations carried out on a carcass are significant contributors to the cost involved in carcass processing.

It is an object of a first aspect of the present invention to provide an automatic processing apparatus for carcasses which is capable of automatically cutting the diaphragm of the carcass during an evisceration operation.

It is an object of a second aspect of the present invention to provide automatic carcass processing apparatus which is capable of efficiently and effectively automatically cutting the brisket of the carcass with minimal risk of damaging the viscera and preferably with minimal loss of body weight.

It is an object of the third aspect the present invention to provide an automatic carcass processing apparatus capable of automatically locating and removing an animal head from a carcass with accuracy and minimal loss or downgrading of saleable meat.

It is an object of the fourth aspect of the present invention to provide an automatic carcass splitting apparatus which is capable of accurately splitting a carcass along the spine with a high degree of repeatability.

According to the first aspect of the present invention there is provided an apparatus for automatically processing an animal carcass, the apparatus comprising suspension means for suspending a carcass in an inverted position with the spine located beneath the carcass and the carcass having an abdominal cavity opening upwardly so as to expose the abdominal side of the diaphragm, the apparatus further comprising a cutting assembly movable relative to the carcass so as to be advanceable into the abdominal cavity adjacent to the diaphragm, the cutting assembly including a cutting support for generally arcuate movement about the length of the carcass within the abdominal cavity and being operable during the arcuate movement to cut the diaphragm around the periphery thereof.

Preferably the suspension means is operative to suspend the carcass with the spine inclined upwardly towards the neck so that the abdominal viscera lay away from the diaphragm within the abdominal cavity under their own weight. The suspension means preferably supports the carcass so that the diaphragm is approximately vertical.

The cutting support in the preferred embodiment is selectively movable generally along the length of the carcass so that the cutting assembly after being advanced into the abdominal cavity enables the cutting means to be advanced into contact with the diaphragm for commencement of the diaphragm cutting operation.

The cutting support may mount the cutting means so as to be capable of varying paths of movement about the cutting support whereby the cutting means is capable of following and cutting differing shapes and sizes of diaphragms as required. For this purpose the cutting support preferably includes a support arm, the cutting means being mounted to an outer end of the support arm, the support arm being pivotally movable about an inner end thereof, the support arm comprising an inner support arm portion and an outer support arm portion, the inner and outer support arm portions being pivotally connected together at an elbow, whereby as the support arm is pivotally moved about the inner end thereof, the cutting means at the outer end can vary its separation from the inner end of the support arm by hinging movement at the elbow.

The cutting means preferably includes a cutter blade, the cutter blade being shielded by a shroud and having a portion of the blade only exposed for cutting action along the diaphragm, the shroud being arranged to bear against and to follow the rib cage wall of the carcass as the cutter blade is moved along its arcuate path whereby the line of cut is closely adjacent to the rib cage wall, the shroud shielding the cutter blade against inadvertent cutting of viscera within the carcass.

In the preferred embodiment the cutting means comprises two cutter tools mounted for simultaneous arcuate movement at opposite sides of the carcass so as to cut the diaphragm at both sides simultaneously. In one alternative, the two cutter tools may be initially positioned at the diaphragm adjacent to the spine of the carcass, the two cutter tools being advanced so as to contour out and around the rib cage wall towards the upper opening in the abdominal cavity through which the cutter assembly extends. In another alternative the two cutter tools are initially located at the diaphragm adjacent to the opening in the abdominal cavity at an upper part of the diaphragm, the two cutter tools being advanced outwardly and downwardly so as to follow the inside wall of the rib cage until the cutting tools reach the vicinity of the spine, the apparatus further including diaphragm holding means for releasably holding the diaphragm at the upper edge thereof adjacent where the cutting tools commence their cutting of the diaphragm, the holding means being arranged to hold the diaphragm against folding down within the abdominal cavity during the advancing movement of the cutting tool towards the spine.

According to the second aspect of the present invention there is provided an apparatus for automatically processing an animal carcass, the apparatus comprising carcass locating means for locating and holding the rib cage and brisket of a carcass against substantial movement, brisket shearing means for cutting the brisket with a shearing action, the shearing means comprising a shearing blade and a reaction member which cooperates with the shearing blade to create the shearing action as the shearing blade is moved relatively towards and away from the reaction member, drive means for advancing the shearing means relative to the carcass so that the shearing blade and the reaction member are located on opposite sides of the brisket, the drive means further advancing the shearing means in use along the brisket in the general longitudinal direction of the carcass and moving the shearing blade relatively towards and away from the reaction member to shear the brisket and the covering tissues.

In the second aspect the drive means is preferably operative to advance the shearing means along the brisket from the end of the brisket nearer the abdomen and towards the neck end of the brisket.

The reaction member may be pivotally movable relative to the brisket about a rear end of the reaction member whereby the reaction member generally follows the contours of the brisket during advance of the shearing means.

The drive means is preferably operative to advance the shearing means in a series of steps, the drive means firstly advancing the shearing means with the shearing blade and reaction member separated, secondly stopping the advancing movement and effecting a cut of the brisket, and thirdly opening the shearing blade for a further advancing movement, this sequence being repeated until the brisket has been cut along its entire length, the reaction member moving pivotally about its rear end during the advancing movements of the shearing means so as to generally follow the contour of the brisket.

The reaction member may comprise an anvil member, the shearing blade being operative to cut downwardly onto an upper reaction surface of the anvil so as to achieve the shearing action between the shearing blade and the anvil. The upper reaction surface of the anvil may be resilient so as to yield as the shearing blade approaches and comes into contact with the anvil thereby enabling complete severing of the brisket and covering tissues.

Preferably the reaction member is arranged to be brought into the animal carcass on the inside face of the brisket, the shearing blade being maintained external to the carcass and being pivotally movable relative to the reaction member to achieve the shearing action.

Preferably the carcass locating means includes means for supporting the carcass in an inverted position with the spine located beneath the carcass throughout the brisket cutting operation whereby the viscera fall away from the brisket internally of the carcass thereby providing a substantially clear inside face of the brisket along which the shearing means is advanced.

According to a third aspect of the present invention there is provided an apparatus for automatically processing an animal carcass so as to remove the animal head from the remainder of the carcass, the apparatus including head holding means, the head holding means comprising locating means for locating in use the animal head in a generally desired position, and clamping means for clamping the head against movement, the apparatus further including stretching means for stretching the neck of the carcass so as to spread the atlas joint, and cutting means comprising a cutting blade which is selectively movable along a cut line located below and generally along the line of the jaw and through the atlas joint so as to sever the head from the remainder of the carcass.

The locating means preferably comprises a cradle engageable with the head, the cradle being movable generally along the longitudinal direction of the head so as to position the cradle in the desired relative longitudinal position before clamping. The carcass is supported preferably in an inverted position with the spine located beneath the carcass and the head hanging downwardly, the locating means being operative to relatively engage with the back of the hanging head, the locating means including sensing means for sensing the presence of the back of the head upon contact being made with the back of the head. The clamping means is preferably operative to clamp the head above the cut line, the clamping means including a jaw clamp for urging the head into the cradle to locate and clamp the head against movement.

The stretching means is preferably operative to move the head holding means relatively away from the remainder of the carcass until there is a predetermined reaction against further stretching of the head away from the carcass. The stretching means may include a reaction sensor mounted to the head holding means, the reaction sensor being located so as to be contacted by the crown of the head whereby upon stretching of the neck the crown of the head acts against the reaction sensor with a force sensed by the reaction sensor.

The cutting blade preferably comprises a shear blade movable from the throat region generally along the jaw line, the shear blade being operatively associated with a shear reaction blade carried by the head holding means, the shear reaction blade being located during the cutting operation adjacent the crown of the head and behind the spread atlas joint.

According to the fourth aspect of the present invention there is provided an apparatus for automatically processing an animal carcass, the apparatus comprising carcass support means for supporting a carcass after removal of the viscera and for restraining the carcass against lateral movement, splitting support means selectively movable lengthwise along the carcass, an opposed pair of spine tracking means carried by the splitting support means and for engaging with the carcass at opposite sides of and in close proximity to the spine of the carcass to straddle the spine and therefore to locate and restrain the spine against lateral movement and for moving along and following the spine along its length, cutting means mounted to the splitting support means and for cutting the carcass along the spine to split the carcass, the cutting means being operative to cut the carcass generally at the location of the tracking means whereby the cutting action of the cutting means occurs where the tracking means is restraining the spine against lateral movement.

Preferably the spine tracking means makes a rolling contact with the spine on opposite sides of the spine, the spine tracking means being urged into engagement with the carcass to positively locate on opposite sides of the spine and to remain on opposite sides of the spine as the spine tracking means moves lengthwise along the spine.

The rolling contact means may comprise two laterally spaced tracking wheels, the rims of which are arranged to contact and roll along the carcass, the axes of the rotation of the two wheels being non-collinear, the closest separation of the rims of the wheels being at the region where the wheels contact the carcass on opposite sides of the spine whereby any lateral force acting on a wheel rim as a result of any tendency of the carcass to move laterally has a component of force acting radially relative to the axis of rotation of the wheel whereby the wheel will strongly resist the lateral movement of the carcass at the spine.

The spine tracking means may comprise two pairs of rolling contact means, the two pairs being spaced lengthwise relative to the carcass, and the two pairs of rolling contact means being carried by tracking support means which is pivotally movable about a transverse axis located between the two longitudinally spaced pairs of rolling contact means so as to maintain at least one of the pairs of rolling contact means in contact with the carcass and straddling the spine at all times.

In an alternative embodiment the spine tracking means may comprise sliding contact means operative to contact the carcass along the sides of the spine and to slide along the carcass, the sliding contact means being urged against the carcass to positively be located on opposite sides of the spine and to remain on opposite sides as the spine tracking means moves lengthwise along the carcass.

The splitting support means preferably comprises a trolley movable along a track located lengthwise relative to the carcass, the splitting support means further including a cutting support mounting the cutting means, the cutting support being movable relative to the trolley towards and away from the carcass so as to vary the height of the cutting means relative to the trolley and relative to the carcass so as to be capable of maintaining an operative position relative to the carcass.

The spine tracking means may be mounted for floating movement along the spine so as to follow the contour of the spine along the length thereof, the splitting support means including feedback means responsive to the floating movement of the spine tracking means and operative to control the height of the cutting support and hence of the cutting means to thereby maintain the desired height of the cutting means relative to the carcass throughout the length of the spine.

Preferably the carcass support means is operative to support the carcass in an inverted position with the spine located beneath the carcass throughout the splitting operation, the carcass support means including means for supporting the legs in a spread condition.

In one embodiment the cutting means may comprise a circular saw arranged in a plane with the general longitudinal direction of the spine being located in the plane of the saw, the circular saw being movable longitudinally along the spine so as to cut through the spine between the opposed spine tracking means where the spine is restrained against lateral movement.

In an alternative embodiment the cutting means may comprise a band saw movable longitudinally along the spine so as to cut through the spine between the opposed spine tracking means where the spine is restrained against lateral movement.

At each of the processing stations, the equipment can be thoroughly cleaned and/or sterilized for reuse so as to prevent cross contamination of carcasses. To this end, the design of such equipment takes into account the need for thorough cleaning.

Possible and preferred features of the present invention will now be described with particular reference to the accompanying drawings. However it is to be understood that the features illustrated in and described with reference to the drawings are not to be construed as limiting on the scope of the invention: In the drawings:

FIGS. 2 and 3 show an apparatus whereby the head of a carcass may be automaticaly removed;

FIGS. 4 and 5 illustrate the means by which hide removal may be completed automatically at a hide pulling station;

Figure 1:
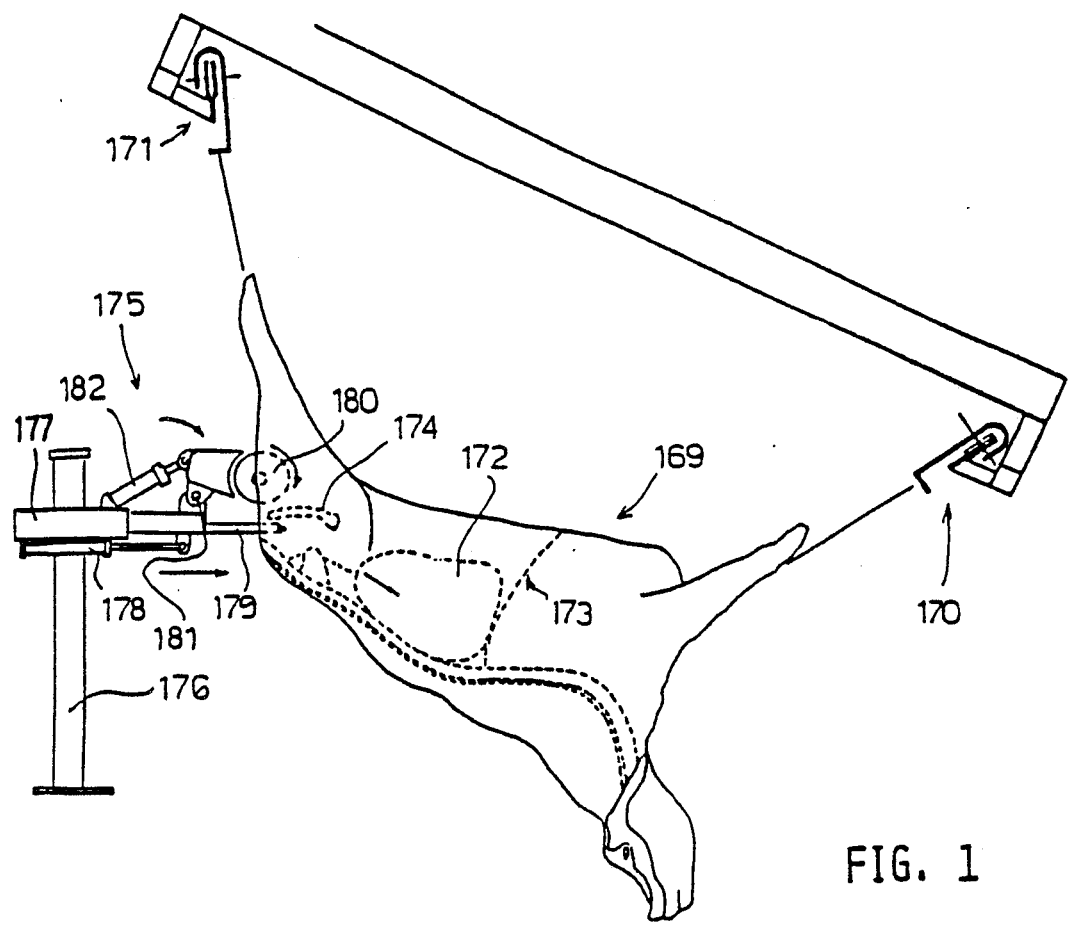
FIG. 1 shows a device for automatic aitchbone cutting and the manner of its operation.

In an abattoir live animals are brought from holding yards, separated and isolated, captured, stunned and stuck. After bleeding and removal of hocks and horns, manual hide prearation may take place. With the carcass inverted, hide is released from the legs and under body to depend at the carcass sides in preparation for removal automatically at a later stage along the line as will be described below. The oesophagus, trachea and arteries are cleared from the thoracic cavity. The pizzle and erector muscles are removed. The legs are then shackled and the shackles are engaged with overhead rails so that, with a suitable drive, which may be similar to existing chains, the carcass is drawn upwardly to an elevated position and inclined with neck down for further processing. Manual operations continue to prepare the carcass for head removal, hide removal and evisceration. This may include severing the head hide; removal of the muzzle; recording of tooth number and sex; removal of the tongue. The tongue and then the head may be passed to a separate conveyor to be separately processed. Head removal may be an automatic operation utilising apparatus as is described below.

Also at the rear end of the carcass, a series of manual operations may be carried out to prepare for aitchbone cutting, hide removal, evisceration and splitting. This may include rumping; mark and strip the tail; remove tail bush; clear and pull the rectum and bung (sphincter); and bag the anus.

Automatic operations may begin after the manual preparation steps and stations enabling this are described below. After most processes, the carcass is split by a suitable means such as a band saw or rotary saw which is described below. Inspection may be undertaken at various stages with condemned carcasses ejected from the line. Trimming may proceed with further inspection after carcass splitting. Carcasses requiring further trimming may be ejected from the line to enable further processing. Finished carcasses may be fed off onto a storage line where carcasses are washed, inspected, etc. on their way to chiller rooms of the usual character. Inspection is undertaken as usual with those carcasses that require it being ejected for a rewash. Decontamination may be undertaken with grading being performed when necessary. The front leg may be released to allow the carcass half to hang from its back leg. The removed shackle might be fed back to the head of the line automatically.

In the following description, there is set out particular preferred structures for processing stations where aitchbones may be cut, heads removed, hides pulled, briskets cut, diaphragms cut and eviscera may be ejected and carcasses may be split. The actual placement of these stations along a processing line of the above described character may be varied according to particular objectives.

The following description makes various recommendations regarding placement of the stations along the above described line but as these may be utilised singly on any processing line they are treated below, separately, and in no particular order under separate headings.

AITCHBONE CUTTING

The aitchbone may be cut in a fully automatic operation performed when the carcass is suspended on overhead rails, transverse to the processing line. The carcass is best suspended neck down at approximately 30° so that the viscera move forwardly away from the hind quarters. The cutting device to be utilised in this operation must be capable of cutting both muscle and bone and it is best shielded so as not to damage the bladder, intestines or rectum. The cutter ought not to produce a jagged cut which might pierce the viscera and cause contamination. During cutting it is preferable to spread the hind legs to 600 mm, dependent upon the type of suspension device used in hanging the carcass off the overhead rails. The foreleg spread is not critical at this station apart from being compatible with the overall system layout.

Aitchbone cutting may be performed as a preparation for evisceration and it can be split at the ventral ridge so as to enable the intestine and rectum to peel off the spine from the posterior of the abdominal cavity and from the pelvic cavity, as the viscera rolls out over the hind legs during the automatic evisceration process. It is possible to operate the processing line without this preparatory step occurring before evisceration with the aitchbone not cut till the carcass is split. Preferably automatic aitchbone cutting is performed following completion of the manual process steps preparatory to evisceration and before head removal. The final series of the manual operations are:

(1) Clearing and freeing the rectum and bung;
(2) Bagging the anus, sealing the end of the rectum to eliminate contamination;
(3) Pushing the bagged anus and rectum back into the pelvic cavity;
(4) Mark and strip tail; and
(5) Removal of tail brush.

The carcass is inclined neck down, prior to the above steps being performed to ensure that urine from the pizzle and faeces from the rectum do not spill out onto the carcass prior to bagging the rectum. This also ensures that the bladder and small intestine are placed clear of the cutting blade.

In operation of the automatic cutting station described below, the carcass is centralised for the cutter to come into the required cutting position and cut through the Gracilis muscle and the aitchbone. The split aitchbone then parts slightly (approximately 10 mm depending on the animal) and the cutter is raised and retracted for cleaning and sterilisation so as to ready it for the next carcass. Suitable cutters may be reciprocating saws, circular saws and cleaver actions with a reaction bar to centralise the cut. Sensors may be provided to determine when the aitchbone has been split to signal when cutter withdrawal may be initiated. The release of tension on the hind legs when the bone is severed provides one method of assessing that the cut has been completed.

In FIG. 1, carcass 169 is suspended at 170 and 171 from overhead rails at an angle of 30° from the horizontal, neck down, as shown. In this position, the viscera 172 have rolled forwardly against the diaphragm 173, away from the aitchbone 174 when the automatic cutter 175 comes into operation. This device may be mounted for vertical movement on a support 176 to be moved along a transverse arm 177 by action of a ram 178 which advances a centering device 179 beneath the aitchbone. When in place for the start of a cut, a rotary cutting blade 180 may be lowered on its pivot 181 by ram 182 to commence cutting when the blade may be advanced by further action of ram 178. Upon completion of the cut, the blade 180 may be lifted and the unit withdrawn by operation of the respective rams for sterilisation.

AUTOMATIC HEAD REMOVAL

To improve the hide pulling cycle time and reduce the forces generated on the forequarter of the carcass by pulling the hide over the head, it is advantageous to remove the head before hide removal and head skin at a separate station.

Figure 3:
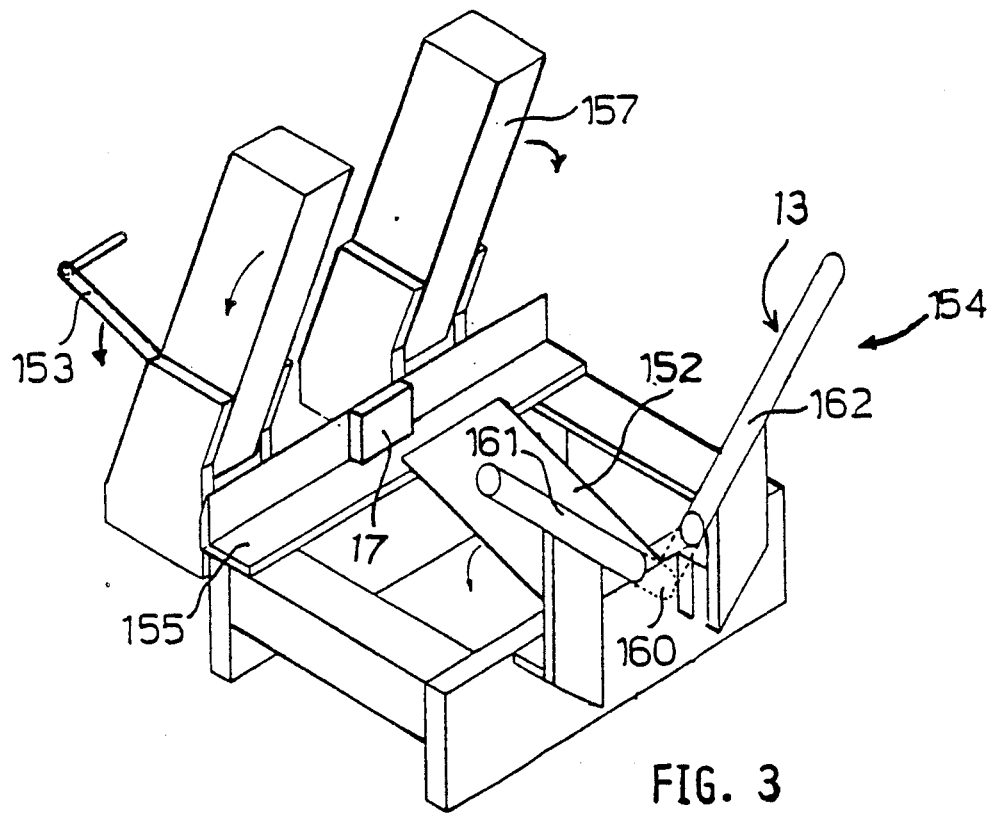

In its operation, the carcass is located centrally over the head removal mechanism, which is described below and the cutting cycle is triggered. FIGS. 2 and 3 illustrate the features of such a mechanism.

The first operation of the auto cycle is to operate head holding means 12 to locate and hold the head and position the cutting means 151. This is achieved by the activation of two limit switches 152 and 153 mounted on the cutting means 151. When the auto cycle begins the cutting means 151 swings up through an arc until the back of the head 10 is sensed by switch 152. This ensures that the head 10 is in contact with the head locating means 13 shown as head cradle 154. The unit then rises vertically until the backbone is sensed by switch 153, positioning the crown of the head 10 in front of the shear reaction blade 155.

It is essential to clamp the head firmly by clamping means 14 to ensure a successful cut. If the head 10 is allowed to roll as the shear blade 156 passes through, then the cutting efficiency is reduced as the drawing action of the blade 156 relative to the head 10 is negated, causing the blade 10 to stall.

The clamping means 14 may operate in two stages:
(1) When the head 10 is in position relative to the cutting means 151, the neck bails 157 swing through 90° to ensure the neck 11 is contained centrally. Simultaneously the jaw clamp 158 swings down onto the head 10, pushing it firmly into the vee shaped cradle 154.
(2) When neck bails 157 and jaw clamps 158 are in position, the cutting means 151 pulls down by operation of stretching means 15 until the crown 16 of the head 10 pulls back up hard against the shear reaction blade 155. This action, while ensuring that the crown 16 of the head 10 is located against the reaction blade 155, also puts the neck 11 in tension to spread the atlas joint to aid the cutting action of the blade 156. Proof of the neck stretching is provided by a reaction sensor 17 such as a pressure switch or limit switch mounted on the reaction blade face.

Then when the neck 11 of the carcass has been stretched, the head transfer clamps 159 lock onto the side of the head 10 to prevent any rocking motion of the head during cutting.

The cutting blade 156 describes a scissor action with the reaction blade 155, following the line of the jaw 9 to shear the head through the atlas joint. The aim of cutting close to the jaw 9 is to leave as much saleable meat on the carcass as possible, and minimise the amount of trimming from the head 10 on the head processing line. Following the removal of the head 10, the head transfer clamps 159 swing the severed head out to transfer it to the head processing line. The mechanism then resets for sterilization and for the next carcass.

The head cradle 154 centralises the head 10 for clamping and ensures that the jaw line is approximately parallel with the cutting blade 156. The gap 160 between the guides 161 and 162 prevents the bridge of the muzzle from rotating. Ram 163 operates to raise the unit on arm 166 up guide rails 164 and 165. The cutting means 151 is pivotally mounted on arm 166 and 167 whereby the angle of cutting means 151 is adjustable. A stretching means 15 comprises a ram 168 enabling the captured head 10 to be drawn downwardly so as to stretch the neck 11. Additional rams (not shown) operate the clamps and cutting blade.

HIDE PULLING

FIGS. 4 and 5 show a carcass 72 suspended by shackles 60 off overhead rails 58 and 59. The shackles may be of the usual character with a rear hook 70 and a fore leg chain 71. Carcass 72 has been partially dressed with hide 74 cleared back from the underside 73 and legs. So as to complete hide removal, a series of hide clamps 75, 76 and 77 may be attached thereto, as shown (with an equivalent set at the opposed side) each attached to a respective mechanical arm 78, 79 and 80, whereby the clamps may be drawn downwardly so as to pull the hide. The angles and rates of pull at each clamp are best optimised so as to remove the hide 74 in as clear a form as possible in order to maintain an acceptable finish on the hide 74 and carcass 72 making the hide suitable for standard processing operations.

Hide removal is best carried out following head removal, and before brisket cutting and evisceration. This is done so as to reduce the hide pulling cycle time and reduce the forces generated on the forequarter of the carcass.

In the above described system, the carcass 72 is initially prepared for the hide pulling operation on a bed-dressing system. This involves removing the hide from the brisket, the under-belly area, and around the front and rear legs. The carcass 72 is then raised and suspended by the four legs to present the rear of the carcass at a suitable height for final preparation. Manual work is carried out on the tail-anus area to prepare the hide 74 so that is will peel down past the anus and from the tail during hide pulling. Also with the carcass in this orientation the rump can be cleared to reduce the tendency for fat to adhere to the hide during pulling.

The suitably prepared carcass 72 is then stretched and traversed into the hide pulling station on rails 58 and 59 and located centrally over the hide pulling mechanism. Stretching of the carcass is carried out to straighten and align the rear leg, so that the subcutaneous tissue will not be torn from the hip area on the carcass. The hide 74 may be pulled from the carcass by clamps 75, 76, 77 of which three are located each side of the carcass, symmetrically, and where as shown three are used then one 77 is on the front leg skin, one 75 on the hind leg skin, and the other 76 at the mid-point between them. The hide pulling clamps may be operable to rise to locate underneath the back of the carcass, and then contour up and around the outside to locate between the carcass 72 and the overhanging flaps of manually cleared hide 74. Once in position the clamps 75-77 close, locking firmly to the hide 74, and the clamp arms 78-80 then begin their pulling down. The hide 74 is initially peeled down horizontally either side of the carcass 72 to a point mid-way where the pulling angle is then best progressively changed so that the hide 74 is pulled more from the forequarter back towards the rear of the carcass. When the hide 74 has been pulled from the carcass 72, the clamps 75-77 open, releasing the hide for transfer away, and the hide removal mechanism resets for the next carcass.

Hide pulling is unmanned at this station for both lean and fat animals. To ensure an acceptable finish is achieved on fatty animals extra "rumping" is carried out on the bed dressing conveyor.

AUTOMATIC BRISKET CUTTING

Referring to FIGS. 6 to 9, to prepare the carcass 183 for evisceration, the brisket 20 is desirably cut open. The carcass is best presented for brisket cutting when orientated horizontally, suspended by the four legs following hide removal and prior to evisceration.

The automation of brisket cutting may be achieved with the carcass 183 and its brisket 20 positioned centrally below a cleaving or shearing means 21. The centralising, cutting, and indexing may be performed in a thirty second cycle time. The carcass 183 may travel transversely into the brisket cutting station and can be stopped upon triggering and a sensor. The brisket 20 may then be centralised with locating means 186 comprised by a vee-shaped clamp pad acting directly on the brisket region. The carcass 183 may remain clamped until the cutting cycle is completed.

Cutting may be achieved, as described below with reference to FIGS. 6 to 9, by an hydraulic knife edge shear blade 189 that can cut open the brisket 20. Such a cutter is suitable because it can cut through both meat and bone to eliminate the traditional marking cut along the brisket centre line. In operation, a shear reaction member 188 is dropped into a marking cut, through the belly between the brisket 20 the pizzle, stopping when it is below the line of the brisket 20. The shearing means 21 can then traverse forward a preset distance so that the brisket 20 is between the blade 189 and the reaction member 188. The blade 189 then acts to cut, open, and traverse forward to the next preset cutting point. The shearing means 21 unit may be free to pivot through say 60° (about axis 22), dampened by a pneumatic cylinder to enable following the brisket contours. As the reaction member 188 runs along the underside of the brisket 20, the shearing means 21 can pivot, keeping the cutting blade angle at a minimum. The shear blade 189 is best advanced the full length of the previous cut before stopping for the next so as to locate the blade 189 in the toe of the previous cut, preventing a miscut. The cycle may be complete after typically, three cuts (see FIG. 9), and the unit may be then removed for cleaning and sterilization ready for the next carcass.

Figure 6:
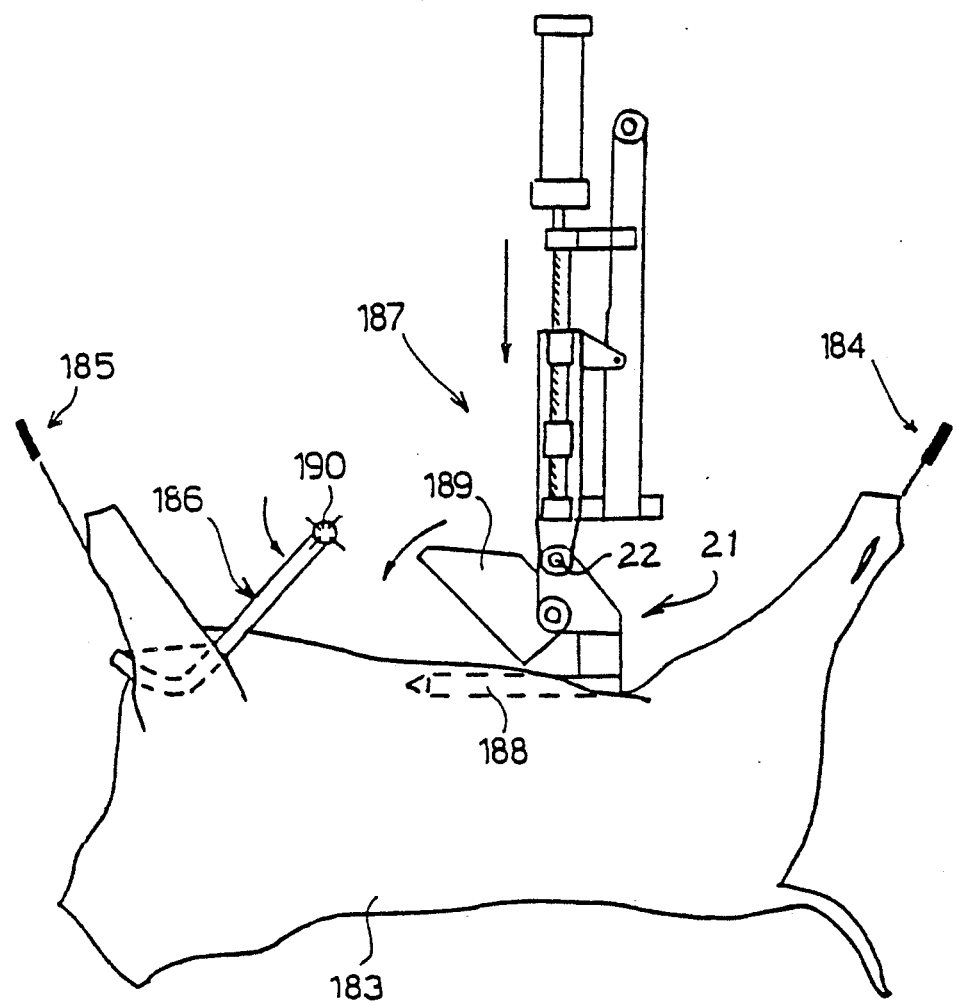
FIGS. 6, 7, 8 and 9 show details of an automatic brisket cutter.

In FIG. 6, carcass 183 is suspended by shackles 184 and 185, belly up with the carcass centralised by a locating means 186 described below with the reference to FIG. 7. A shearing means 21 is lowered through a belly cut with reaction member 188 dropped below the brisket 20 when the shearing means 21 may be advanced with blade 189 open, to an initial cutting point when blade 189 is closed to shear through the brisket 20. By opening the blade 189 and advancing the unit 187, a number of cuts may be made as the unit advances forwardly to complete a cut through the entire length of the brisket.

Figure 7:
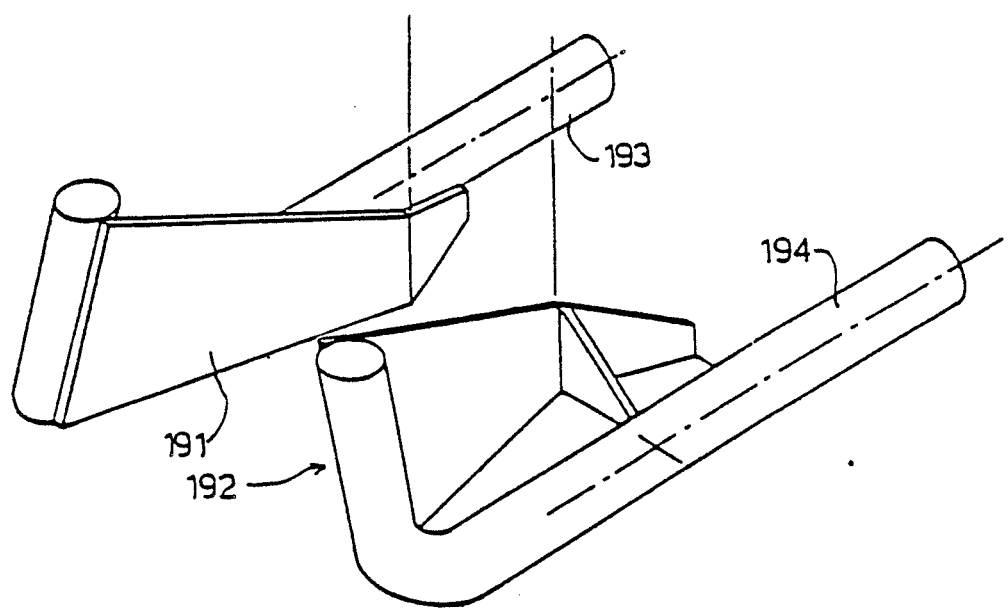

In FIG. 7 is shown a perspective view of the jaws 191, 192 of locating means 186 of FIG. 6 which may pivot downwardly about point 190 until jaws 191 and 192 contact the carcass as shown in FIG. 6. The locating means comprises a pair of downwardly dependent, rotably mounted arms 193 and 194 with a pair of plates as shown attached at their forward end to establish contact with the carcass and centralise the brisket 20 with the shearing means 21.

Figure 8:
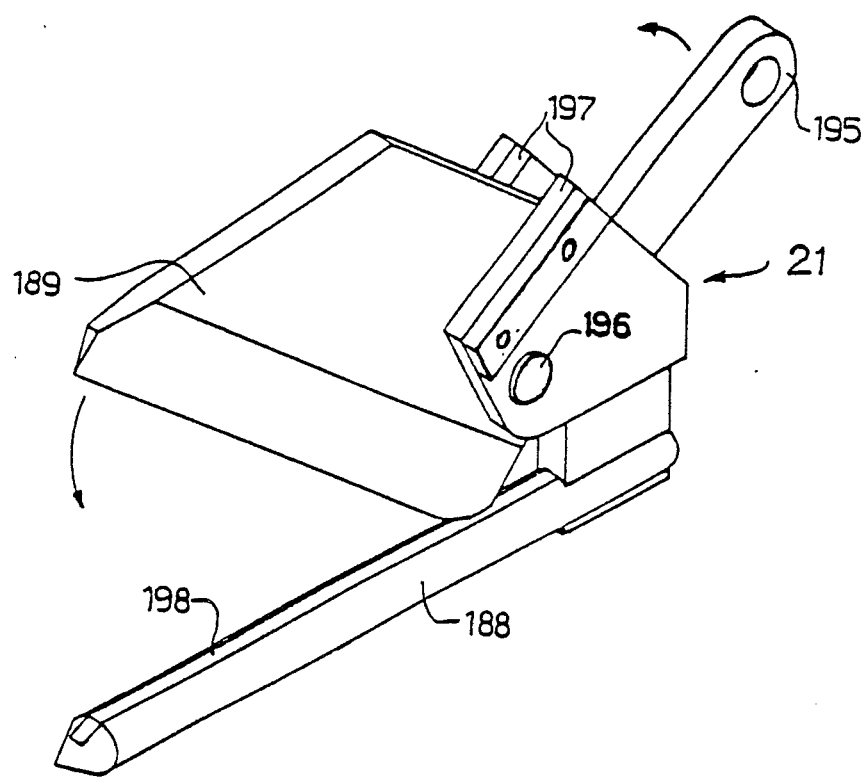
Figure 9:
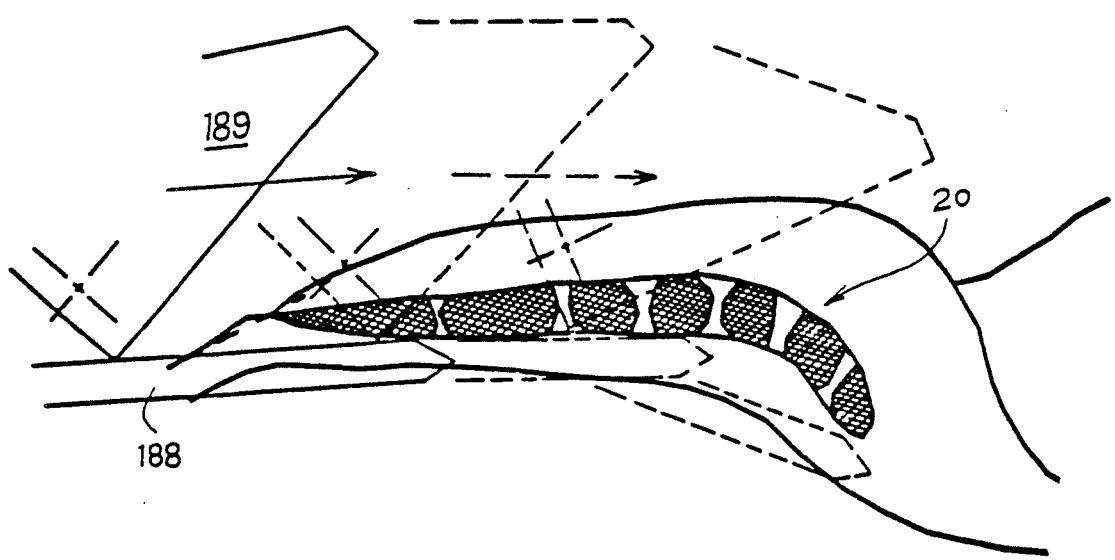

FIG. 8 shows the shearing means 21 in greater detail. The brisket 20 of a carcass 183 is scissored between shear blade 189 and a reaction member 188 by action of a hydraulic cylinder (not shown) acting on arm 195 so as to turn blade 189 in support blocks 197 about pivot 196. The reaction member 188 acts as an anvil onto which the blade 189 cuts. The anvil is fitted with a Ralloy insert 198 for engagement of the cutting blade 189 at the closure of the blade 189 at the completion of a cut. The insert 198 is resilient to yield as the blade 189 approaches and comes into contact with the anvil to enable complete cutting of the brisket 20 and covering tissues and without splintering.

EVISCERATION PROCESS

Figure 12:
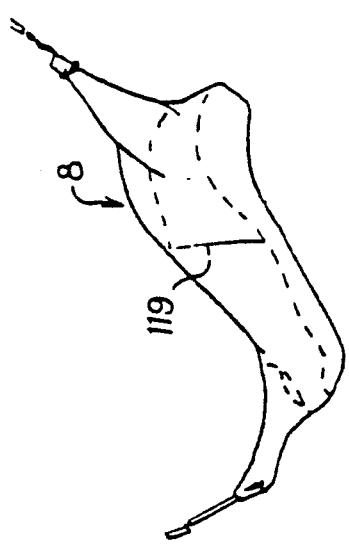
FIGS. 12 and 13 illustrate the carcass orientations that may be employed for aitchbone cutting and automatic evisceration.
Figure 13:
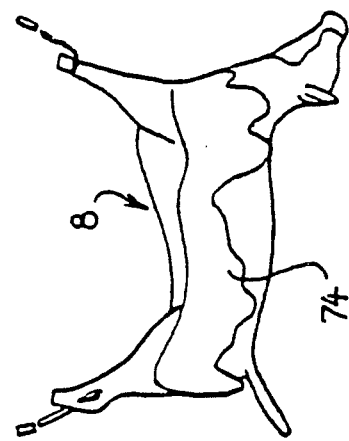
Figure 10:
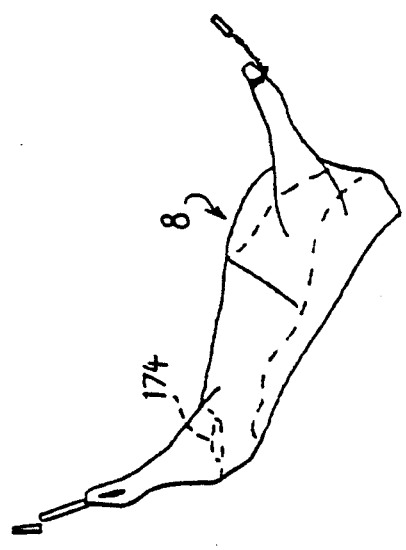
FIGS. 10 and 11 illustrate the various carcass orientations for manual preparation for hide removal and evisceration.

The evisceration procedure may be as follows:
(1) the first operation for the evisceration process is opening up the belly, which is carried out with the carcass 8 on the bed dressing conveyor 25 in the position shown in FIG. 10 when the steps of (a), (b), (c), and (d) below may be performed.
(2) following the work-up of the hide 74 as seen in FIG. 10 the carcass 8 is suspended by all four legs horizontally as in FIG. 11 and conveyed along transversely through the remaining processes. The carcass 8 is then orientated head-down as in FIG. 12 to assist the manual workup. In this position the slaugterman removing the tongue and cheek hide also completes the clearing of the trachea and arteries from the thoracic cavity and sternum area;
(3) the carcass 8 orientated head-down as in FIG. 12, ensures the bladder and viscera are placed clear to allow for automatic splitting of the aitchbone 174;
(4) then following the head removal and hide pulling, the brisket 20 is automatically cut open;
(5) the carcass 8 is then orientated head-up as seen in FIG. 13 (approximately 30° to the horizontal) to position the internal organs away from the diaphragm 119, which is now orientated vertically;
(6) as described in more detail below, a pair of mechanical cutting tools, which may be circular blades, reciprocating or high pressure water, then come down through the opened belly, locate the back of the abdominal cavity then contour up the inside of the cavity wall cutting away the diaphragm 119, preferably from bottom to top;
(7) then with the carcass 8 still orientated head-up, a mechanical scoop 143 then enters the thoracic cavity at the neck and follows down along the spine inside the carcass 8 to clear the heart/lungs initially and finally pulling clear the complete eviscera including the kidneys;
(8) finally when the complete viscera has dropped out between the hind legs onto the evisceration conveyor, it may still remain attached by two arteries situated either side of the spine, and by connective tissue. A mechanical gripper would then clamp the remaining tissue and arteries, to allow a pulling or cutting action to take place to sever the attachments.

The mechanical operations may be carried out at a number of separate stations.

The initial preparation of the carcass 8 may involve the following steps in the bed dressing position of FIG. 10:

(a) remove the scrotum or udder;
(b) clear, rod and tie the weasand (trachea) to eliminate regurgitation of ingesta;
(c) clear the oesophagus and arteries from the anterior of the thoracic cavity and sternum area; and
(d) open up the belly (abdominal cavity).

Figure 11:
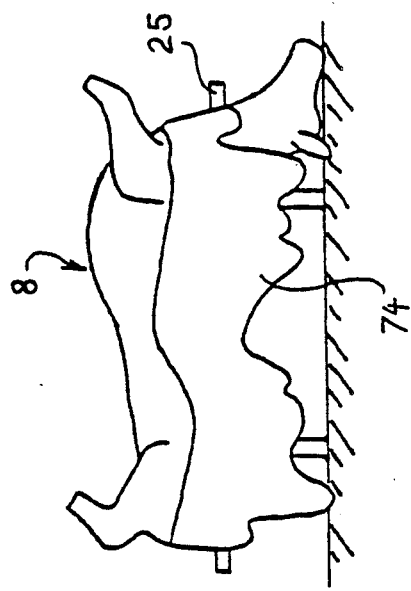

The final series of manual preparations are carried out on the suspended carcass as in FIG. 11 with the neck inclined downwardly at typically 30°. These operations are:

(A) remove the tongue;
(B) complete the clearing of the oesophagus; trachea and arteries from the thoracic cavity;
(C) remove the pizzle and erector muscles;
(D) clear and pull the rectum and bung (sphincter);
(E) bag the anus, sealing the end of the rectum to eliminate contamination.

Following the above manual processing, the carcass may be automatically conveyed through stations to split the aitchbone, remove the head and the hide, cut the brisket and then eviscerate.

In the following description is set out a fully automatic evisceration process operative on a carcass supported by its legs. The apparatus that performs the process is located following brisket cutting and before splitting. Two stations for diaphragm cutting and viscera removal are described. These operate with the carcass 8 on overhead rails transverse to the direction of the line.

Figure 14:
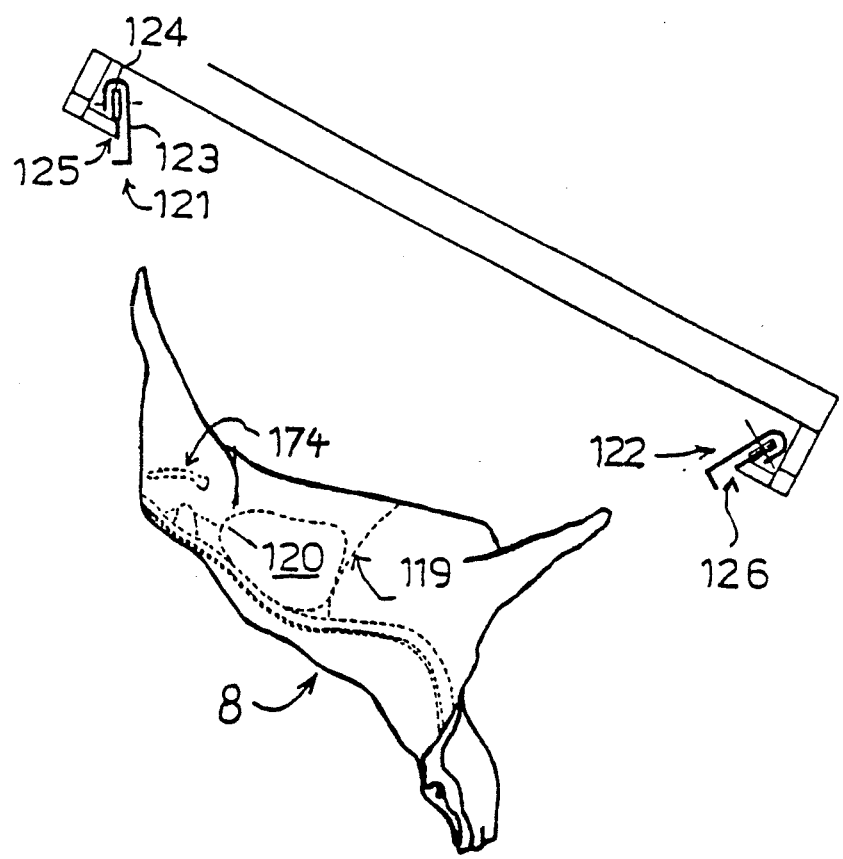
FIG. 14 is a detail of the disposition of anatomical parts and carcass at a stage enabling aitchbone cutting.

In FIG. 14 is shown the aitch bone cutting position with the carcass 8 head down such that the viscera 120 are rolled downwardly against the diaphragm 119. The orientation may be achieved by proper placement of overhead rails 121 and 122. At 121, a typical beef or meat roller, herein referred to as shackle 123 is fitted with a roller 124 running on a rail 125. Similarly at 122 a shackle runs on rail 126 which is tilted and lowered to achieve the desired support angle. In this position, the aitchbone 174 may be cut with least likelihood of damage to the viscera and consequent contamination of the carcass.

Figure 15:
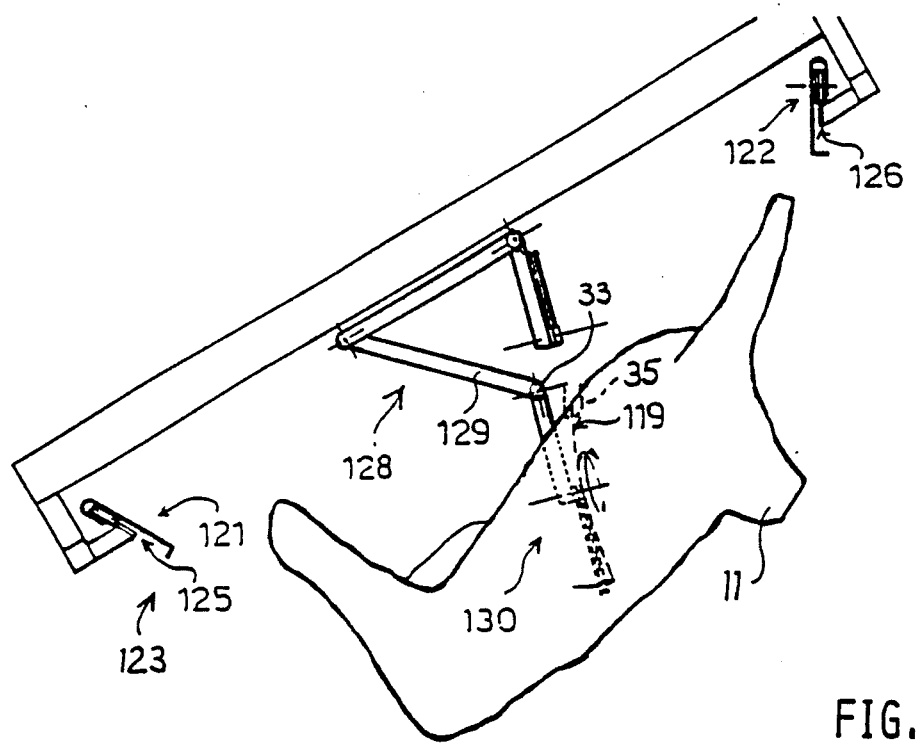
FIG. 15 is a detail of the disposition of anatomical parts and carcass at a stage whereat the diaphragm is cut.

In FIG. 15 the rails 125 and 126 are differently positioned and the carcass 8 is in a head-up position when the viscera will be rolled back away from the diaphragm 119. The head-up position preferably has the carcass 8 at a 30° slope with the fore legs and hind leg spread at typically 1200 mm dependent on the type of shackle and roller that are used with a longitudinal separation of typically 2700 mm at both stations.

Figure 16:
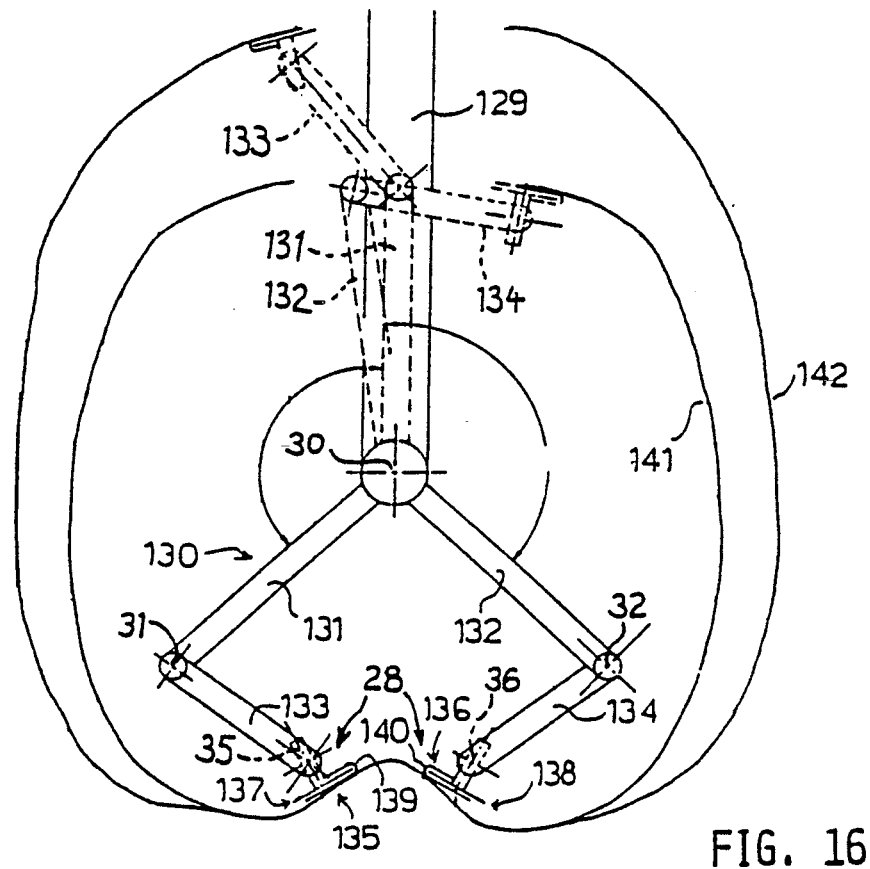
FIG. 16 is a transverse view through the apparatus of FIG. 15.
Figure 17:
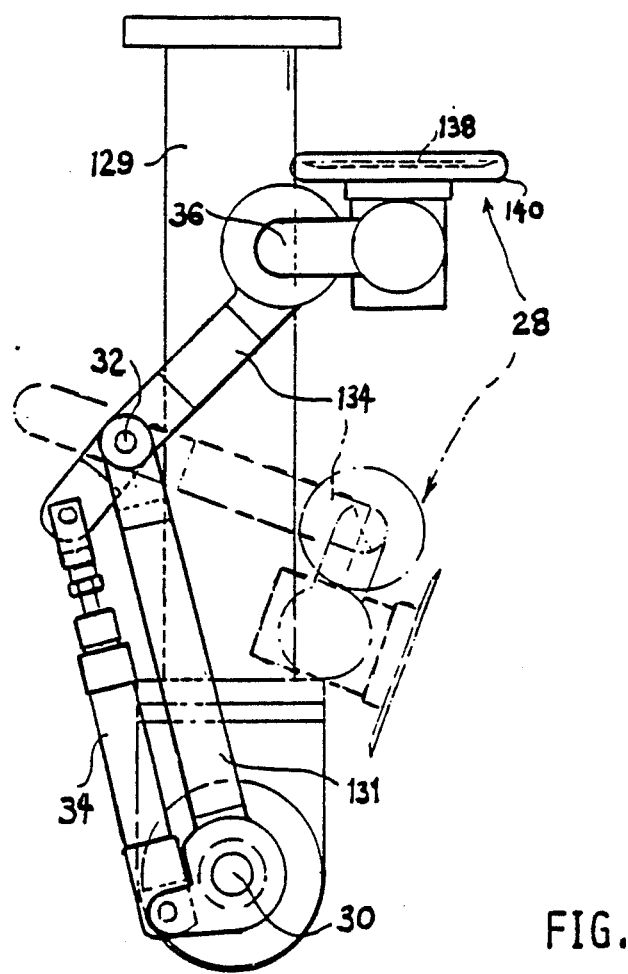
FIG. 17 is a detailed view of a possible diaphragm cutter.

FIGS. 15, 16 and 17 show a pair of cutters that may be employed in the cutting of the diaphragm 119. An overhead assembly 128 lowers a cutting assembly 130 on a cutting support 129. The cutting assembly 130 comprises two arms 131 and 132 carrying pivotal fore arms 133 and 134 having cutting means 28 having cutter devices 135 and 136 at the ends thereof. The cutting devices 135 and 136 comprise rotary blades 137 and 138 in shrouds 139 and 140. The cutting blades 137 and 138 rotate on an axis that is permitted to pivot on orthogonal axes 35, 36 for enabling the cutting blades 137, 138 to remain in optimal cutting orientations. In operation, support arm 129 drops to a preset depth into the abdominal cavity, typically 100 mm, then it floats under the control of program logic. On dropping, arm portions 131 and 132 pivot forwardly about axis 33 to find the diaphragm 119 and they follow it down to a point typically 280 mm from the top of the diaphragm 119, when the cutters 135 and 136 are rotated down to a starting point as seen in FIG. 16 when the cutters 135, 136 are started and their support arm portions 131 and 132 are rotated upwardly, following the rib cage wall 141, 142 by portions 133, 134 pivoting about elbows 31, 32 and cutters pivoting about axes 35, 36, severing the diaphragm 119 from the bottom up. The outer arm portions 133, 134 can be urged or biased outwardly to maintain contact with the rib cage walls 141, 142, e.g. by air cylinder 34 acting on the outer end of arm portion 134 as shown in FIG. 17. FIGS. 16 and 17 show in broken lines some possible positions of the support arm portions 131–134.

The shrouds 139 and 140 run along the rib cage wall 141, 142 to align their blades 137 and 138. The circular blades 137, 138 may be powered remotely through flexidrive cables (not shown) or motors, such as air motors 33, located at the blades 137, 138 (FIG. 17).

FIG. 16 shows in outline, typical minimum and maximum sizes of rib cage 141, 142 that may have to be accommodated by the apparatus. The pair of cutters 137, 138 commence at a position adjacent the spine clear of the "psoas major" to sever the entire "thick skirt" from the abdominal cavity wall. Cutting proceeds simultaneously on each side to the posterior of the sternum. Typically, the diaphragm 119 is severed within 5 mm (max.) from the wall 141, 142 of the abdominal cavity. The shielding 139, 140 reduces the likelihood of damage to the viscera.

In an alternative possibility to starting the cutting at the spine, the apparatus may include diaphragm holding means 35 movable into position adjacent the upper edge of the diaphragm 119 and operable to releasably hold the upper edge while the cutting tools 137, 138 advance outwardly and downwardly to follow the rib cage wall 141, 142 until they reach the spine.

Figure 18:
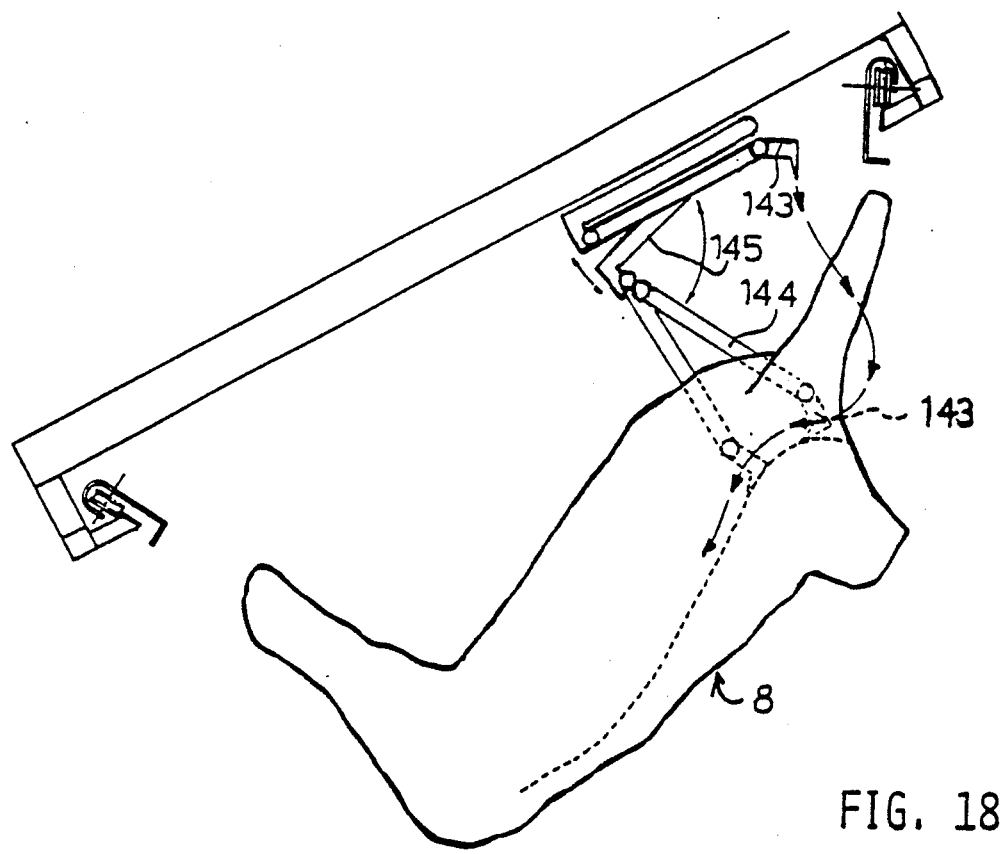
FIG. 18 shows an apparatus for ejecting viscera.
Figure 19:
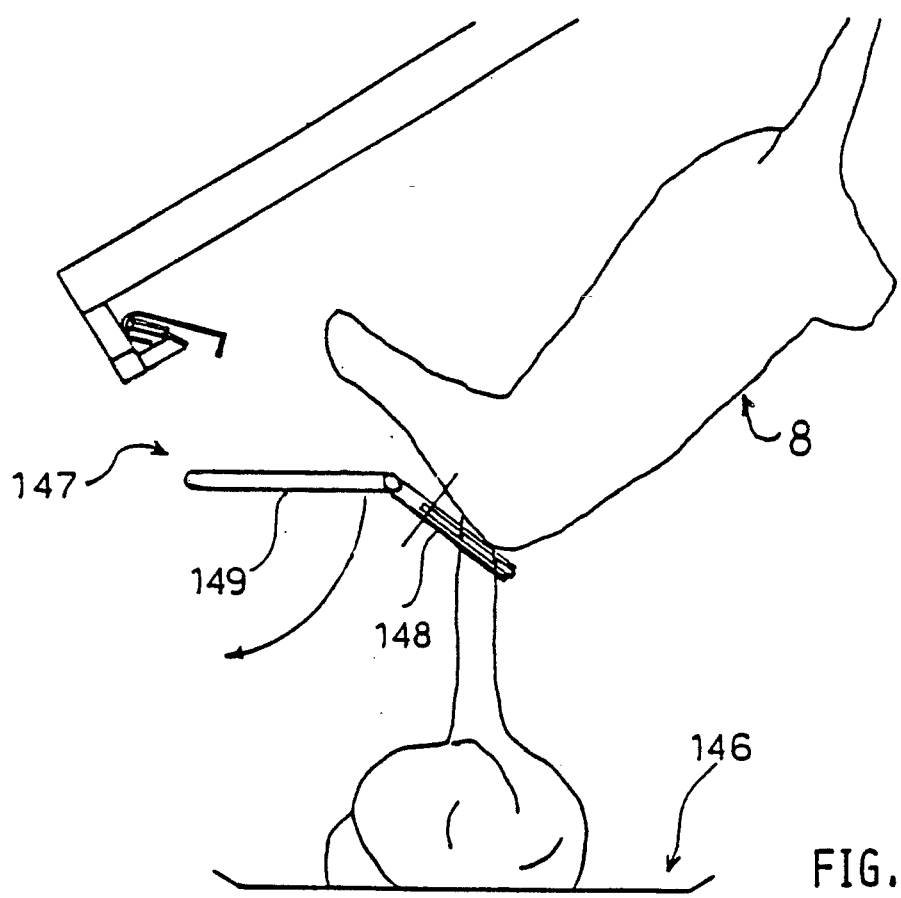
FIG. 19 shows an apparatus to sever eviscera attachments and the tail.

After diaphragm cutting, the viscera are pushed rearwardly and FIG. 18 illustrates an apparatus suited to cutting the heart and lungs comprising a pusher assembly 143 that follows the spine. The pusher assembly 143 is pivotally mounted on arm 144 which is lowered by support arm 145. The mechanical arm follows the spine, tearing the viscera from it as close to the posterior of the pelvic cavity as is possible when the viscera will fall, as shown in FIG. 19 onto a viscera conveyor 146. At this point the viscera may be connected to the carcass 8 by a column of connective tissue thereof and the clamping assembly 147 of FIG. 19 may complete the operation by either a pulling or a cutting operation. Typically, the distance between the pelvic cavity and the viscera conveyor 146 should not be less than 1000 mm. The clamping assembly 147 comprises a clamp arm 148 on a support 149 by which it is moved into and out of position.

CARCASS SPLITTING

Figure 20:
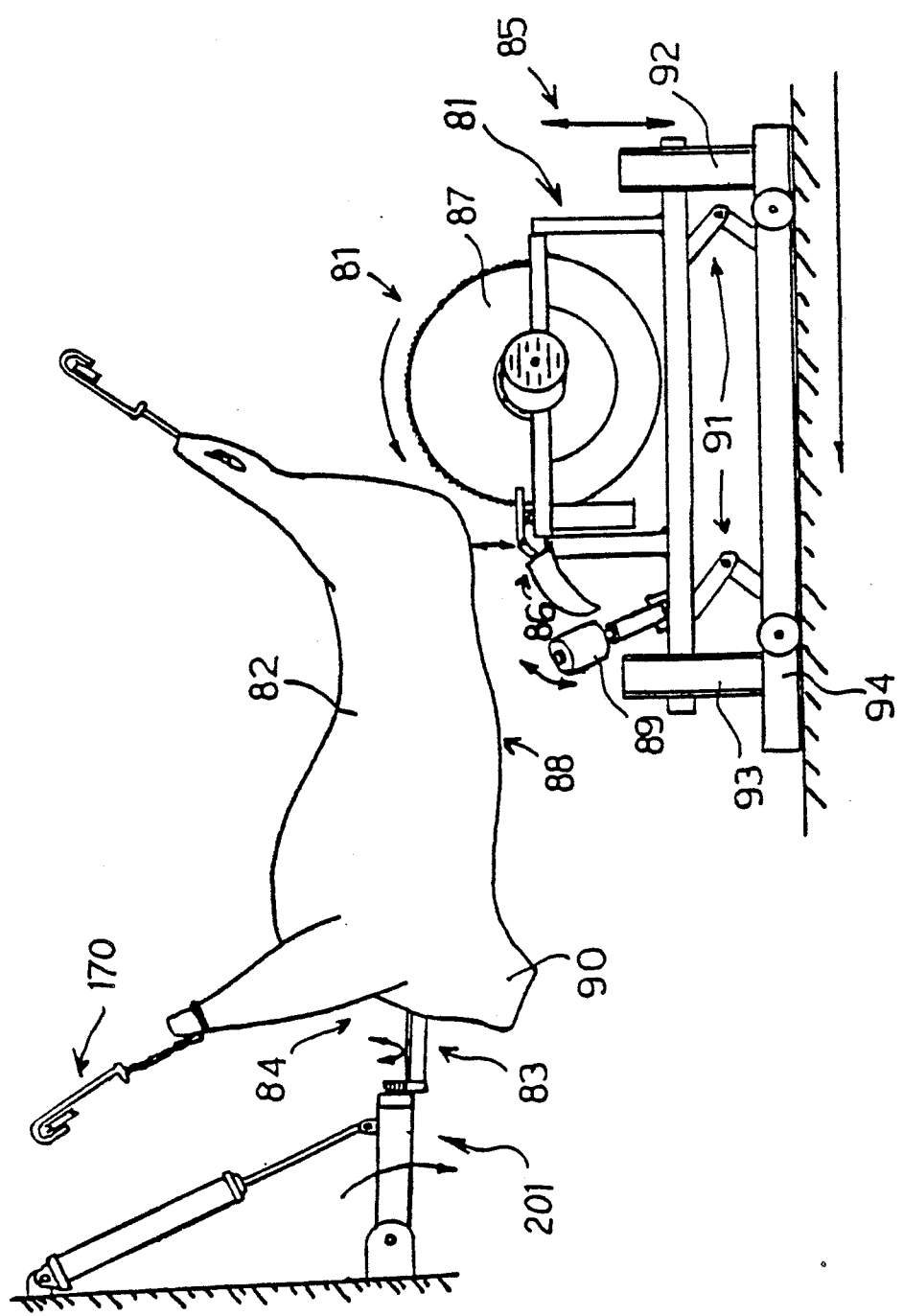
FIG. 20 shows the components of a carcass splitter that employs a rotary saw.

Splitting may be carried out as shown in FIG. 20 with the carcass 82 hanging horizontally by the four legs. Preferably, as with head removal, hide removal and evisceration, the carcass 82 is conveyed transversely or longitudinally through the splitting station.

Figure 27:
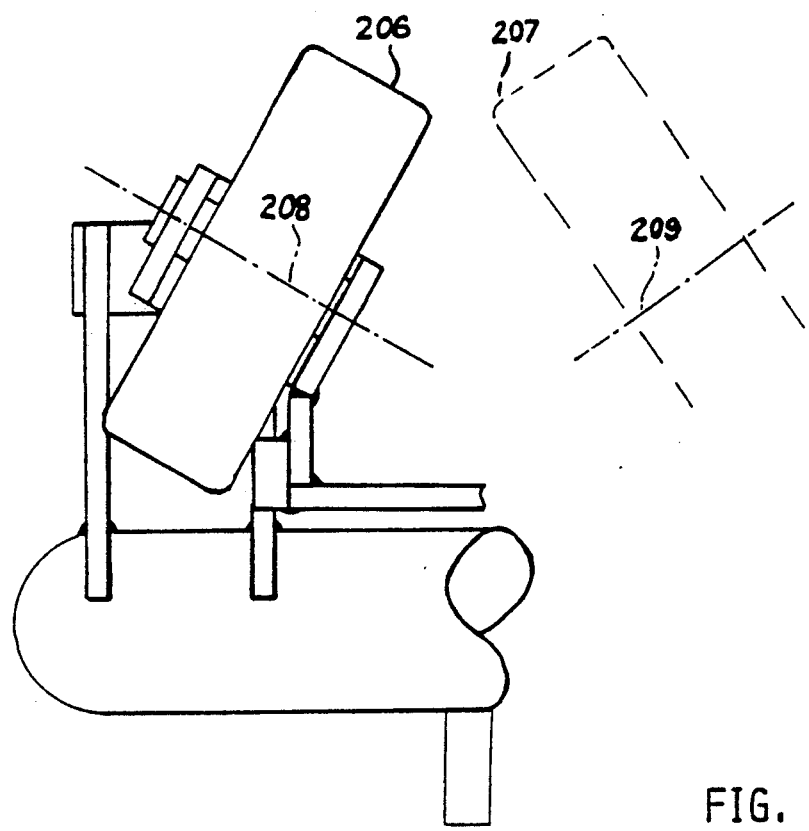
FIGS. 27 and 28 are side and end views of an alternative spine tracking means used in carcass splitting.
Figure 28:
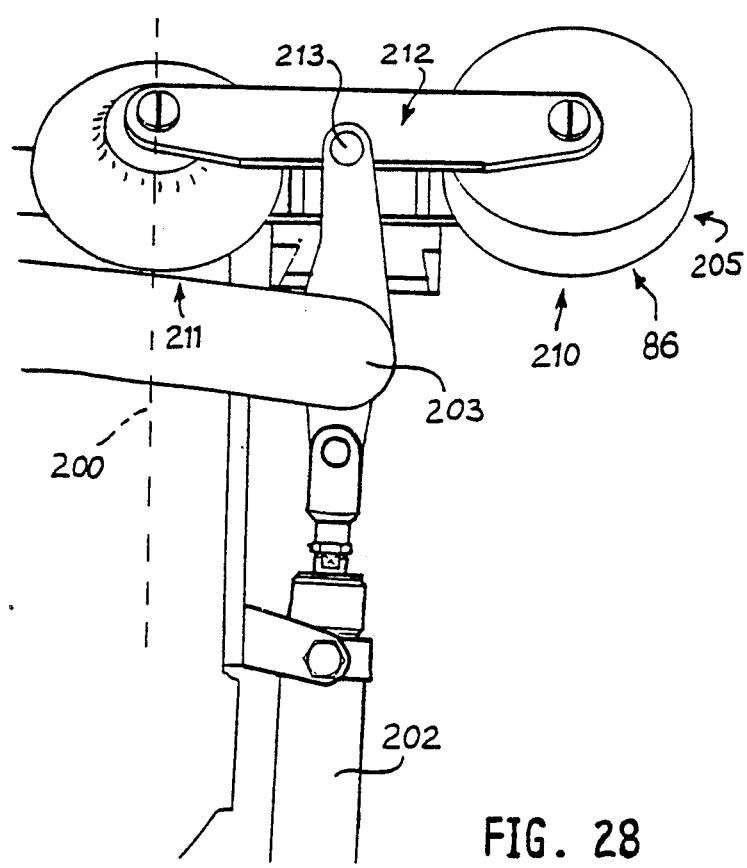
Figure 29:
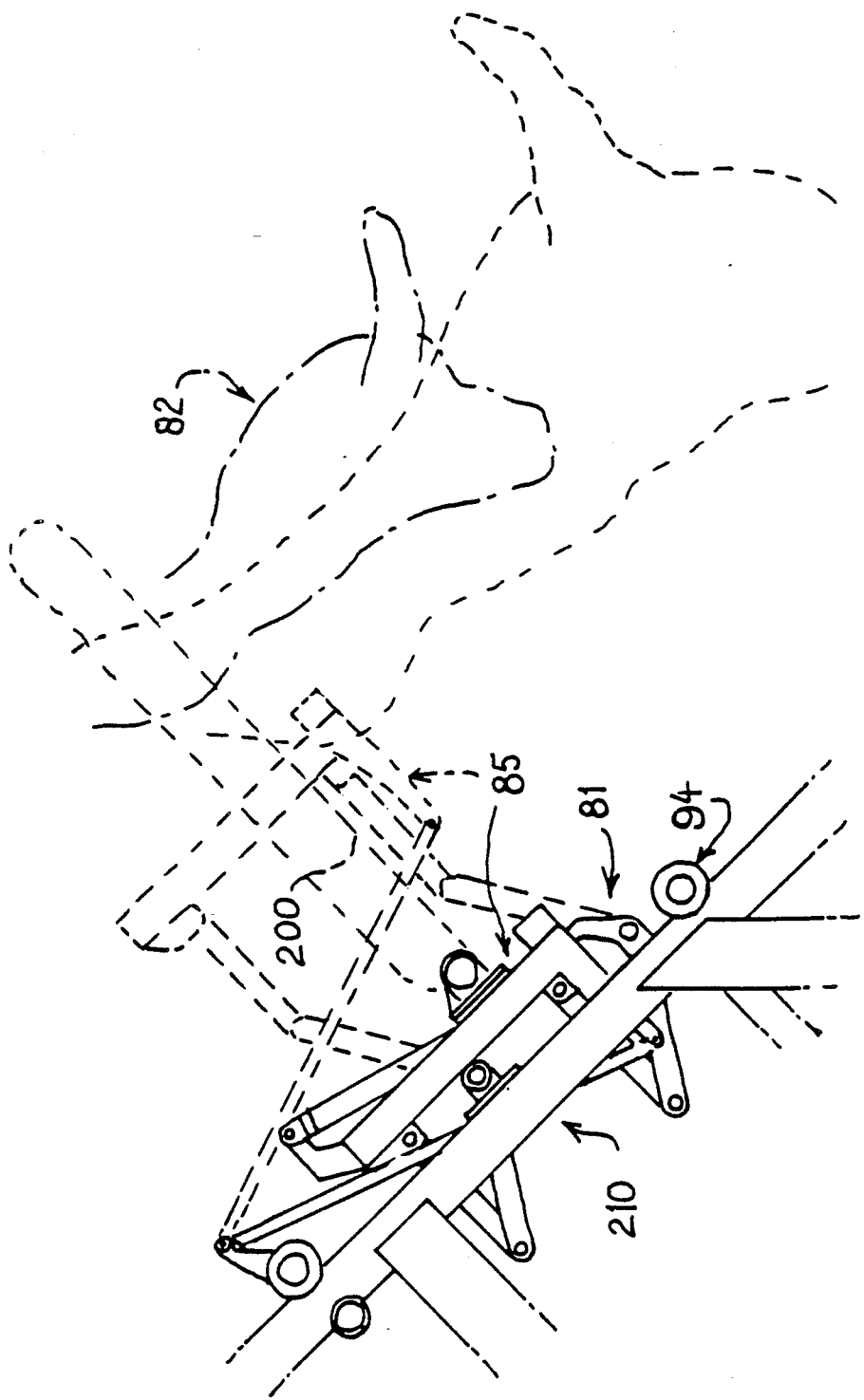
FIG. 29 is a side view of an alternative carcass splitter support means.

Splitting of the carcass 82 in FIGS. 20 to 26 is achieved using a circular saw 87 passing through the length of the carcass 82 from underneath. A bandsaw 200 could also be used as shown in FIGS. 27 to 29.

Initially the carcass 82 is supported and located centrally over the splitting mechanism by suitable support means (170; 171, 201). As with the other processes, the beef line can be stop/start with the splitting saw 87, 200 stationary, or the splitting saw can be indexed along, splitting the carcass 82 on the move. Referring to FIGS. 20 to 26, with the carcass 82 in position the splitting cycle is initiated. The process begins with means 201 for restraining the carcass against lateral movement being brought into operation by centralizing the forequarter of the carcass by lowering down the brisket locating arm 83 through the open brisket 84. The parallel fingers 95, 96 then spread to rigidly locate centrally the spine in the forequarter area.

The rear of the spine is then located and the splitting support means 81 comprising saw trolley 94 moves into position to begin cutting. Once in position tracking means 86 is used to centralise the spine in relation to the saw blade 87. This guide 86, acting on a pneumatic spring, follows the back of the carcass 82 underneath controlling the raising and lowering of the saw 87 to contour along the back 88 of the carcass 82. This ensures that the spine is aligned as the saw 87 passes through the carcass 82. As the saw 87 approaches the neck area a pair of roller guides 89 may swing in on either side of the neck 90 to give extra support and guidance as the saw cuts through the neck 90. The neck guide 89 is used to eliminate the tendency for the neck to swing about and cause the cut to "soft-side", that is run off centre. When the saw 87 has completed the splitting of the carcass 82 the saw is lowered and then returns to the start of travel to be sterilized ready for the next carcass.

The saw blade 87 is mounted to a cutting support 85 for vertical movement and its height may be automatically adjusted by the contouring of the tracking means 86 along the spine. Vertical movement might be controlled by links 91 lifting the saw mount up posts 92 and 93 on wheeled trolley 94 which may be driven along the length of the carcass 82 and returned when splitting is complete.

Figure 21:
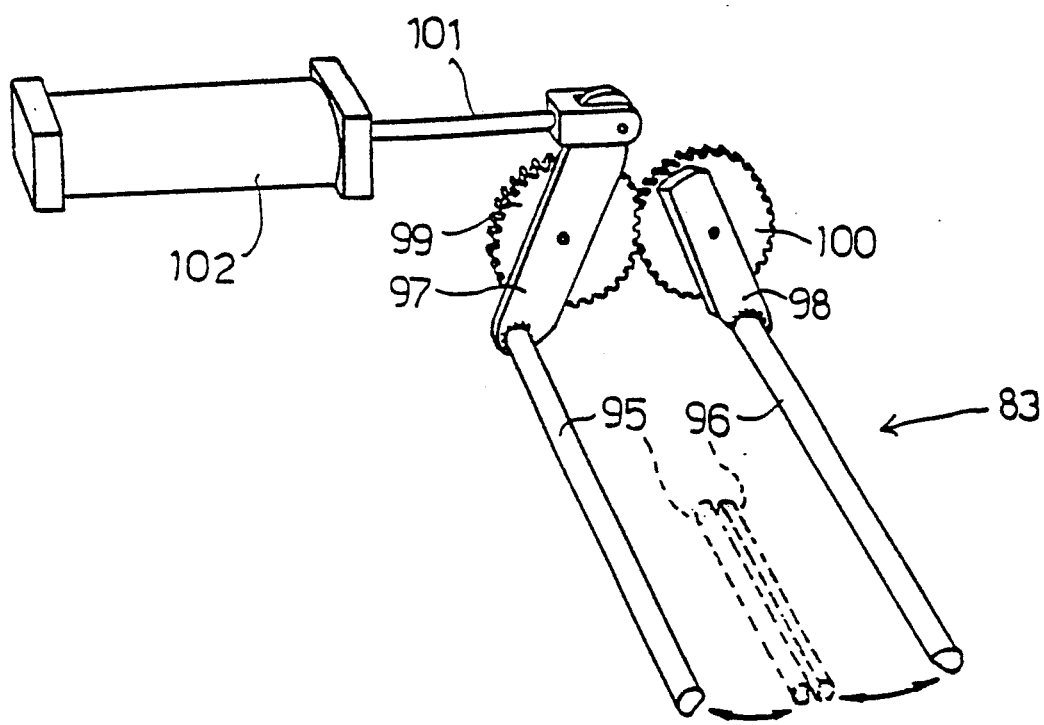
FIG. 21 is a detail of a brisket clamp that can be used in the carcass splitter of FIG. 20.

In FIG. 21, brisket locating arm 83 comprises two clamp fingers 95 and 96 which are movable to and fro on arms 97 and 98 which are angularly intermeshed by gears 99 and 100 so that when ram 102 acting through rod 101 moves arm 97, the clamp fingers 95 and 96 are activated between a closed and open position. The brisket clamp 83 is initially closed, lowered into the brisket and opened so as to open the brisket with a predetermined force.

Figure 22:
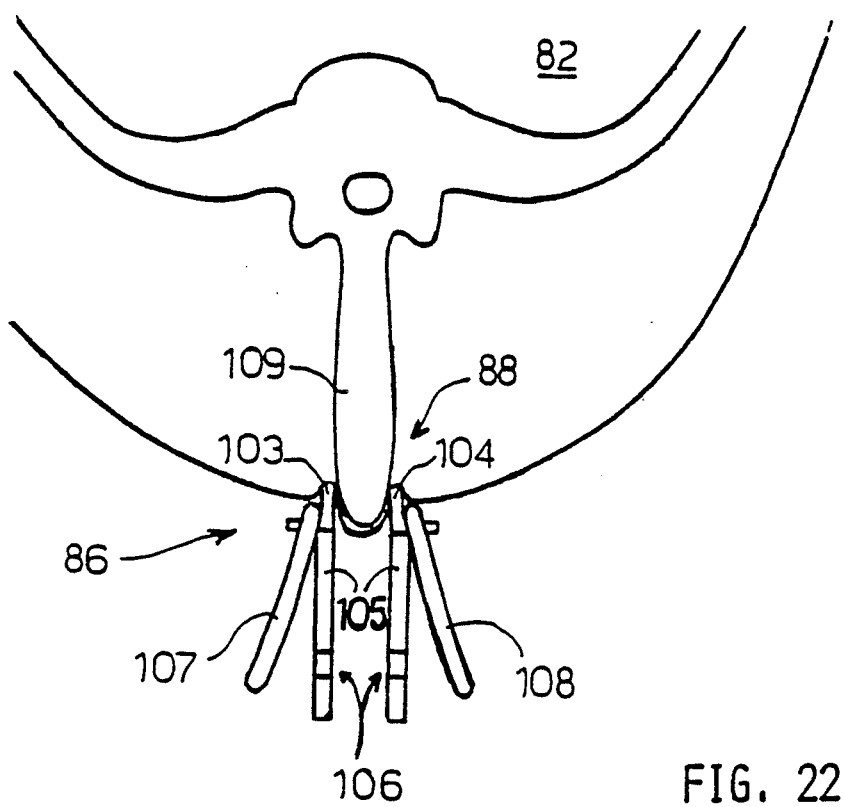
FIGS. 22 and 23 show details of a spine tracking means for use in the carcass splitter of FIG. 20.
Figure 23:
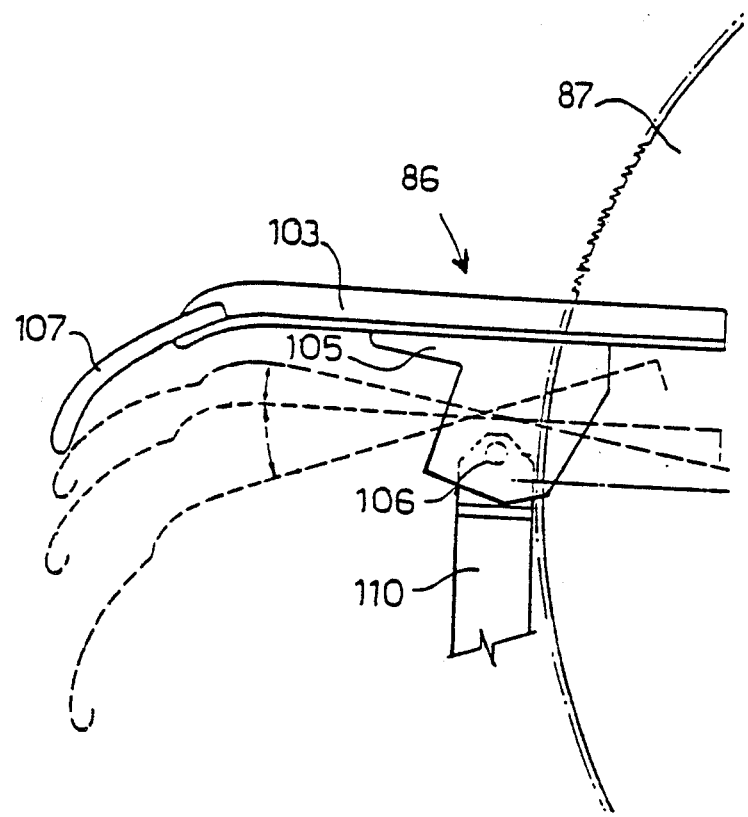

FIGS. 22 and 23 show detailed views of the spine tracking means 86 which contours along the spine 88 of carcass 82. Two spaced sliding contact means in the form of rails 103 and 104 span the feather bones 109 of the spine of carcass 82 and are guided thereby along the spine to restrain the spine against lateral movement and to set the height of the saw blade 87. The flared extensions 107 and 108 catch and locate the spine when the splitter is initially moved up behind a carcass. The spine tracking means 86 is supported on a pivotal mount 105 on a pin at 106 over a stem 110 so as to permit angular tilting when following the contour of the spine.

Figure 24:
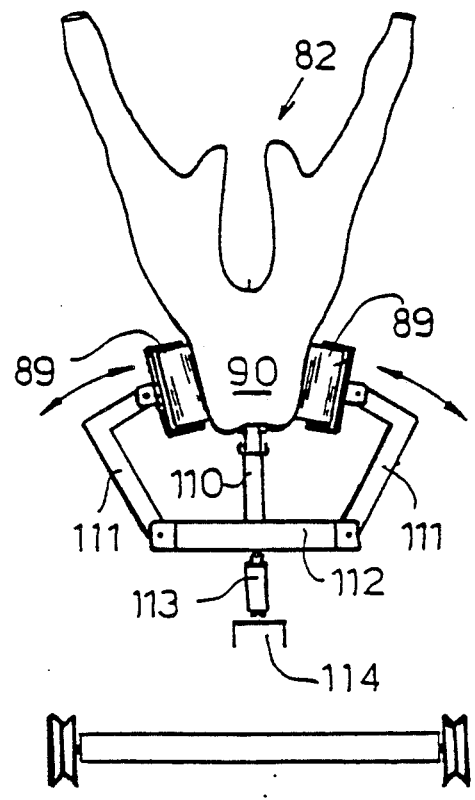
FIGS. 24 and 25 show details of a neck guide for use in the carcass splitter of FIG. 20.
Figure 25:
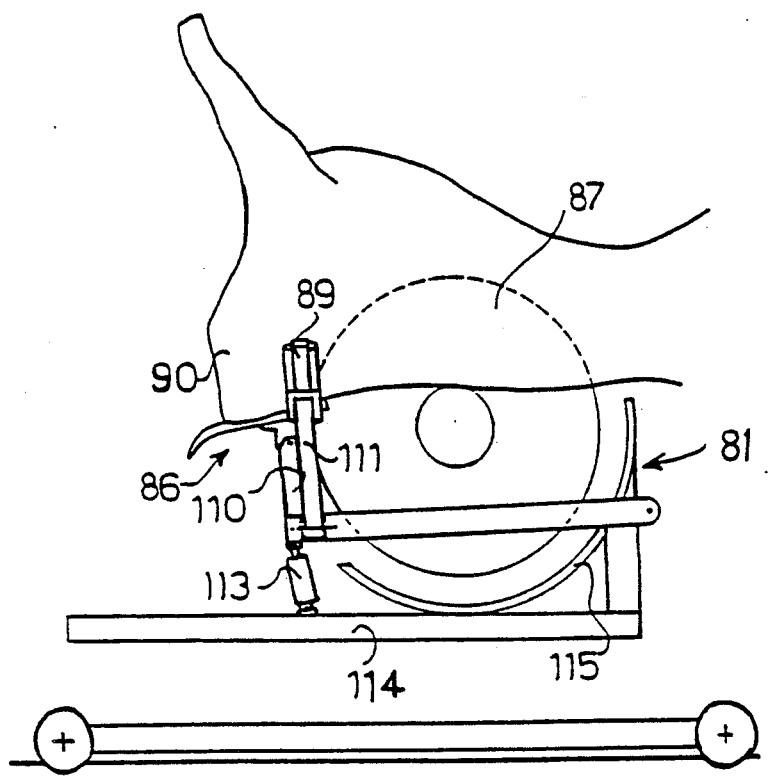

In FIGS. 24 and 25, neck rollers 89 are mounted on control arms 111 which are constrained to move equally about their vertical support line through cross bar 112 over supporting mechanisms 113 and 114. The rollers 89 may contour over the variable neck surface but they act equally to centralise the neck 90. The saw 87 may be provided with a shroud 115.

Figure 26:
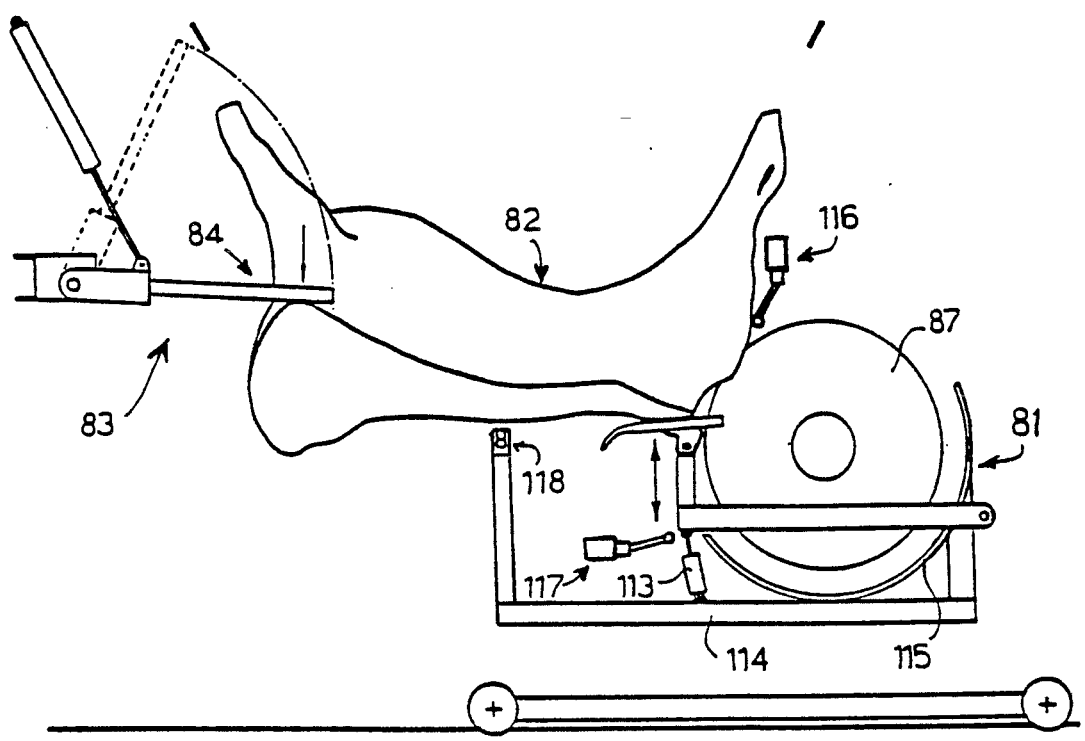
FIG. 26 shows the location of various sensors used in an automatic carcass splitter.

In FIG. 26 is shown the general location of sensors 116, 117 and 118 which may be utilized so as to enable operation of the splitter. Sensor 116 may be a limit switch to sense the rear of carcass 82. Sensor 117 may be a limit switch to control the contouring of the back 88. Sensor 118 may be a photo optic beam sensor to register the back height. A pneumatic cylinder 113 may adjust the spine tracking means for contouring.

In FIGS. 27 and 28 there is shown an alternative spine tracking means 86 which makes a rolling contact with the spine on opposite sides of the spine. The spine tracking means is urged into engagement with the carcass 82 e.g. by air ram or cylinder 202 acting through arm 203 which is pivotally supported about its end remote from the tracking means 86. This positively locates the tracking means 86 on opposite sides of the spine and maintains that engagement as the tracking means 86 moves along the spine.

As shown in FIG. 28, the rolling contact means 205 comprises two laterally spaced tracking wheels 206, 207 the rims of which are arranged to contact and roll along the carcass 82. The axes 208, 209 of rotation of the two wheels 206, 207 are non-collinear. The closest separation of the rims of the wheels 206, 207 is at the region where the wheels contact the carcass 82 so that any lateral force acting on a wheel rim as a result of any tendency of the carcass 82 to move laterally has a component of force acting radially relative to the axis of rotation so that the respective wheel 206, 207 will strongly resist the lateral movement of the carcass 82 at the spine.

As shown in FIG. 27, the spine tracking means 86 comprises two pairs of rolling contact means 210, 211, the pairs 210, 211 being spaced lengthwise relative to the carcass 82. The pairs 210, 211 are carried by tracking support means 212 which is pivotally movable about transverse axis 213 located between the pairs 210, 211 so as to maintain at least one of the pairs 210, 211 in contact with the carcass 82 and straddling the spine at all times.

In FIG. 29 there is shown maximum and minimum expected sizes of carcass 82 suspended neck down and having an associated support frame 210 on which trolley 94 runs. The trolley 94 supports the splitting support means 81 which in turn mounts the cutting support 85. The support 85 is selectively movable between the collapsed condition shown in full line and the extended position shown in broken line so that the bandsaw 200 carried by the support 85 can be adjusted in position relative to the carcass 82. The support 85 can support tracking means 86 generally as shown in FIGS. 27 and 28 so that the line of cutting of the bandsaw 200 is directly between the rolling support means 211 in FIG. 27.

By utilizing the above described means, a carcass 82 might be split automatically when suspended by all four legs. The splitting apparatus is preferably located immediately following evisceration, and operates transversely or longitudinally to the overhead rails. A mechanism may be provided to ensure a desired leg spread across the fore legs and hind legs during splitting. The rail separation can be used to determine the optimum fore and aft leg spread. Either of a band saw 200 or a circular saw 87 may be used with the blade acting as a rigid member with low lateral deflection (typically less than 2 mm) with an orientation that results in one vertebra being cut completely before a new one is commenced. Splitting might proceed with the tail in place. The use of the respective tracking means 86 and guides 89 is such as to prevent "soft siding", the tendency of the saw to follow a line of least resistance.

The above apparatus may operate in the following manner. The carcass 82 can be indexed to the splitting saw 87, 200 in a transverse position following evisceration. The fore legs and hind legs are then spread. The brisket guide 83 can be lowered through the open sternum into the thoracic cavity and the fingers 95, 96 of the guide are then spread to locate the ribs. The tail bone is located to enable the start of sawing, the saw trolley 94 is positioned and the saw 87, 200 is activated. The spine tracking means 86 contact the tail bones to align the centre line of the vertebrae with that of the saw 87, 200. Sawing progresses with the trolley 94 moving at constant speed.

Laterally spreading the fore legs assists in aligning the carcass 82 and provides lateral stability. Too great a spread strains the shoulders excessively and adds to the force required at the spine tracking means 86 so as to centralise the feather bones 109. Decreasing the spread reduces the sternum opening and interferes with operation of the brisket guide 83. Hind leg spreading likewise stabilises the carcass 82 but too much or too little affects tracking of the saw 87, 200. For and aft spreading requires to be likewise optimized for stability. The brisket guide 83 gives lateral stability and its force at the rib cage is optimized for this purpose (typically 870 Newtons). The spine tracking means 86 operates effectively with a vertical force that is typically 160 Newtons. The neck rollers 89 should engage the neck 90 at a position forward of the saw blade 87, 200 to avoid it being braked as would occur if it were placed after the cut.

In operation of the splitting apparatus, control of a cycle is achieved by the saw support 85 being moved up till a photo optic beam 188 is broken indicating the carcass 82 is in place. The saw 87, 200 is turned on, the trolley 94 moves forward and the saw is lowered, typically 50 mm. Contact of the limit switch 116 stops forward motion of the trolley 94. The spine tracking means 86 is moved up until limit switch 117 is tripped and this positions the cutting saw 87, 200 about 50 mm, in a typical situation, from the tail bone. The forward travel and vertical contouring mechanisms are then initiated and splitting begins. Following splitting, the saw trolley 94 may be retracted, cleaned and reset for the next operation.

It is to be understood that various alterations, modifications and/or additions may be made to the features of the possible and preferred embodiment(s) of the invention as herein described without departing from the spirit and scope of the invention.

We claim:

1. An apparatus for automatically processing an animal carcass, the apparatus comprising suspension means for suspending a carcass in an inverted position with the spine located beneath the carcass and the carcass having an abdominal cavity opening upwardly so as to expose the abdominal side of the diaphragm so that the abdominal viscera lay away from the diaphragm within the abdominal cavity under the weight of the abdominal viscera, the apparatus further comprising a cutting assembly movable relative to the carcass so as to be advanceable into the abdominal cavity adjacent to the diaphragm, the cutting assembly including a cutting support and a cutting means movably mounted to the cutting support for generally arcuate movement about the length of the carcass within the abdominal cavity and being operable during the arcuate movement to cut the diaphragm around the periphery thereof.

2. An apparatus as claimed in claim 1 characterised in that the suspension means is operative to suspend the carcass with the spine inclined upwardly towards the neck so that the abdominal viscera lay away from the diaphragm within the abdominal cavity under their own weight.

3. An apparatus as claimed in claim 2 characterised in that the suspension means supports the carcass so that the diaphragm is approximately vertical.

4. An apparatus as claimed in claim 1 characterised in that the cutting support is selectively movable generally along the length of the carcass so that the cutting assembly after being advanced into the abdominal cavity enables the cutting means to be advanced into contact with the diaphragm for commencement of the diaphragm cutting operation.

5. An apparatus as claimed in claim 1 characterised in that the cutting support mounts the cutting means so as to be capable of varying paths of movement about the cutting support whereby the cutting means is capable of following and cutting differing shapes and sizes of diaphragms as required.

6. An apparatus as claimed in claim 5 characterised in that the cutting support includes a support arm, the cutting means being mounted to an outer end of the support arm, the support arm being pivotally movable about an inner end thereof, the support arm comprising an inner support arm portion and an outer support arm portion, the inner and outer support arm portions being pivotally connected together at an elbow, whereby as the support arm is pivotally moved about the inner end thereof, the cutting means at the outer end can vary its separation from the inner end of the support arm by hinging movement at the elbow.

7. An apparatus as claimed in claim 1 characterised in that the cutting means includes a cutter blades, the cutter blade being shielded by a shroud and having a portion of the blade only exposed for cutting action along the diaphragm the shroud being arranged to bear against and to follow the rib cage wall of the carcass as the cutter blade is moved along its arcuate path whereby the line of cut is closely adjacent to the rib cage wall, the shroud shielding the cutter blade against inadvertent cutting of viscera within the carcass.

8. An apparatus as claimed in claim 1 characterised in that the cutting means comprises two cutter blades mounted for simultaneous arcuate movement at opposite sides of the carcass so as to cut the diaphragm at both sides simultaneously.

9. An apparatus as claimed in claim 8 characterised in that the two cutter blades are initially positioned at the diaphragm adjacent to the spine of the carcass, the two cutter blades being advanced so as to contour out and around the rib cage wall towards the upper opening in the abdominal cavity through which the cutter assembly extends.

10. An apparatus as claimed in claim 8 characterised in that the two cutter blades are initially located at the diaphragm adjacent to the opening in the abdominal cavity at an upper part of the diaphragm, the two cutter blades being advanced outwardly and downwardly so as to follow the inside wall of the rib cage until the cutter blades reach the vicinity of the spine, the apparatus further including diaphragm holding means for releasably holding the diaphragm at the upper edge thereof adjacent where the cutter blades commence their cutting of the diaphragm, the holding means being arranged to hold the diaphragm against folding down within the abdominal cavity during the advancing movement of the cutter blades towards the spine.

* * * * *